United States Patent
Beshai

(10) Patent No.: US 9,762,479 B2
(45) Date of Patent: Sep. 12, 2017

(54) DISTRIBUTED ROUTING CONTROL IN A VAST COMMUNICATION NETWORK

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 0 days.

(21) Appl. No.: 14/935,460

(22) Filed: Nov. 9, 2015

(65) Prior Publication Data
US 2016/0134524 A1    May 12, 2016

Related U.S. Application Data

(63) Continuation-in-part of application No. 14/741,475, filed on Jun. 17, 2015.

(60) Provisional application No. 62/077,321, filed on Nov. 10, 2014.

(51) Int. Cl.
| | |
|---|---|
| H04J 14/00 | (2006.01) |
| H04L 12/721 | (2013.01) |
| H04J 14/02 | (2006.01) |
| H04J 3/06 | (2006.01) |
| H04L 12/715 | (2013.01) |

(52) U.S. Cl.
CPC .......... *H04L 45/44* (2013.01); *H04J 3/0661* (2013.01); *H04J 3/0682* (2013.01); *H04J 14/0269* (2013.01); *H04L 45/04* (2013.01); *H04L 45/12* (2013.01)

(58) Field of Classification Search
CPC ..... H04L 65/1069; H04L 45/28; H04L 47/10; H04L 12/66; H04L 45/304; H04L 45/00; H04L 45/44

USPC .......................................................... 398/47
See application file for complete search history.

(56) References Cited

U.S. PATENT DOCUMENTS

| | | | |
|---|---|---|---|
| 8,830,823 B2 | 9/2014 | Koponen et al. | |
| 8,837,493 B2 | 9/2014 | Casado et al. | |
| 8,837,497 B2 | 9/2014 | Beshai | |
| 8,855,006 B2 | 10/2014 | Gloss | |
| 9,143,430 B2 | 9/2015 | Beshai | |
| 2003/0198233 A1* | 10/2003 | Suda | H04Q 11/04 370/395.71 |
| 2005/0198312 A1* | 9/2005 | Ashwood-Smith | H04L 41/0659 709/228 |
| 2009/0296719 A1* | 12/2009 | Maier | H04L 45/12 370/400 |
| 2009/0324232 A1* | 12/2009 | So | H04Q 11/0062 398/83 |
| 2010/0172236 A1* | 7/2010 | Madrahalli | H04J 3/14 370/225 |

(Continued)

*Primary Examiner* — Don N Vo

(57) ABSTRACT

Multiple network controllers are interconnected in a full mesh structure, e.g., through a cyclical cross connector, to form a distributed control system for a network of a large number of nodes. A network controller acquires characterizing information of links emanating from a respective set of nodes, communicates the information to each other network controller, and determines a route set from each node of the respective set of nodes to each other node of the network. The network controller may determine, for each link included in the route set, identifiers of specific route sets which traverse the link. Accordingly, a state-change of any link in the network can be expeditiously communicated to network controllers to take corrective actions where necessary. A network controller may rank routes of a route set according to some criterion to facilitate selection of a favourable available route for a connection.

18 Claims, 30 Drawing Sheets

(56) References Cited

U.S. PATENT DOCUMENTS

2011/0129222 A1* 6/2011 Karol ................. H04J 14/0257
398/58
2014/0003810 A1* 1/2014 Dong ..................... G02F 1/011
398/48

* cited by examiner

R1 Trajectory

| 01 | 02 | 03 | 04 | 05 | 06 | 07 | 08 | 09 | 10 | 11 | 12 | 13 | 14 | 15 | 16 | 17 |
|----|----|----|----|----|----|----|----|----|----|----|----|----|----|----|----|----|
|    |    |    |    | 16 | 05 |    |    |    |    |    |    |    |    |    | 17 |    |

← 710
← 720(1)

| R1 | R2 | R3 | R4 | R5 | R6 | R7 | R8 | R9 | R10 |
|----|----|----|----|----|----|----|----|----|-----|
| 33 | 34 | 46 | 47 | 40 | 49 | 45 | 46 | 50 |     |

← 730
← 740(1)

R2 Trajectory

| 01 | 02 | 03 | 04 | 05 | 06 | 07 | 08 | 09 | 10 | 11 | 12 | 13 | 14 | 15 | 16 | 17 |
|----|----|----|----|----|----|----|----|----|----|----|----|----|----|----|----|----|
|    | 14 |    |    |    | 03 |    |    |    |    |    |    |    | 17 |    |    |    |

← 710
← 720(2)

| R1 | R2 | R3 | R4 | R5 | R6 | R7 | R8 | R9 | R10 |
|----|----|----|----|----|----|----|----|----|-----|
|    | 34 | 62 | 47 | 40 | 49 | 61 | 54 | 58 |     |

← 730
← 740(2)

R3 Trajectory

| 01 | 02 | 03 | 04 | 05 | 06 | 07 | 08 | 09 | 10 | 11 | 12 | 13 | 14 | 15 | 16 | 17 |
|----|----|----|----|----|----|----|----|----|----|----|----|----|----|----|----|----|
|    |    |    |    |    | 11 |    |    |    | 17 | 10 |    |    |    |    |    |    |

← 710
← 720(3)

| R1 | R2 | R3 | R4 | R5 | R6 | R7 | R8 | R9 | R10 |
|----|----|----|----|----|----|----|----|----|-----|
|    |    | 62 | 47 | 48 | 57 | 61 | 54 | 58 |     |

DISTRIBUTED ROUTING CONTROL IN A VAST COMMUNICATION NETWORK

CROSS-REFERENCE TO RELATED APPLICATIONS

The present application claims the benefit of provisional application 62/077,321 filed on Nov. 10, 2014, the entire content of which is incorporated herein by reference, and is a continuation-in-part of U.S. patent application Ser. No. 14/741,475 filed on Jun. 17, 2015, the specification of which is incorporated herein by reference in its entirety.

FIELD OF THE INVENTION

The invention relates to the field of telecommunications networks. In particular, the invention is directed to methods and apparatus for distributed control of networks of wide coverage having a large number of nodes.

BACKGROUND

Current processing and information-storage capabilities inspire rethinking the entire art of design and control of telecommunications networks. The structural and operational complexity, and ensuing inefficiency, of current networks was necessitated by physical limitations of network nodes. With these limitations largely removed, new methods of network configuration and control need be investigated. In particular, there is a need to develop methods of efficient routing in a large-scale network, covering a large number of nodes.

The prior art teaches routing control in a network having numerous switching nodes. In particular, U.S. Pat. No. 6,944,131 teaches dividing a network having numerous switching/routing nodes into multiple domains where each domain has a domain controller selected from a set of domain controllers and a node may dynamically elect a preferred domain controller according to topological factors and network state. For example, a node may report to its nearest accessible domain controller as a primary domain controller, with the option to switch to any other domain controller in case of lost communication with the primary controller.

The prior art further teaches source routing. In particular, U.S. Pat. No. 6,744,775 teaches storing at each node a route set defining at least one route to each other node. The routes of a route set containing more than one route may be ranked according to some criterion.

The prior art also teaches numerous methods of disseminating link-state information. As an alternative to traditional routing-control methods based on broadcasting state-change of a link in the network, U.S. Pat. Nos. 8,265,085 and 8,837,497 teach generating an inverse routing table which identifies specific nodes of a network having routes traversing each inter-nodal link.

SUMMARY

A number of network controllers, each associated with a group of nodes of a vast communication network, having a large number of nodes interconnected by links, exchange link information to compute respective portions of a global routing table providing a route set for each directed node pair of the network. The network controllers collectively determine an inverse routing table identifying all routes traversing each individual link in the entire network and exchange node or link state-transition information for updating individual route sets affected by any node state or link state transition.

The network controllers may be interconnected in a full mesh structure, e.g., through a cyclical cross connector, to form a distributed control system. A network controller acquires characterizing information of links emanating from a respective set of nodes. The network controller communicates the information, fully or partially, to other network controllers and determines a route set from each node of the respective set of nodes to each other node of the network. The network controller may determine, for each link included in the route set, identifiers of specific route sets which traverse the link. Accordingly, a state-change of any link in the network can be expeditiously communicated to appropriate network controllers to take corrective actions where necessary. A network controller may rank routes of a route set according to some criterion to facilitate selection of a favourable available route for a connection.

The present invention provides methods and apparatus for computing end-to-end routes for a vast communication network having a large number of nodes. Multiple network controllers, each assigned a respective group of nodes, cooperatively share the processing effort. A network controller of a group acquires characterizing information of local links emanating from local nodes of the group, communicates the information to each other network controller, reciprocally receives characterizing information from other network controllers, and determines a generic route set from each node to each other node of the network. Optionally, an inverse routing table identifying all routes traversing each individual link in the entire network may be determined.

In accordance with an aspect, the present invention provides a system of distributed determination of end-to-end routes in a network. The system comprises multiple network controllers, where each network controller is communicatively coupled to a respective set of nodes of the network nodes. Each network controller acquires local characterizing information of each link emanating from each node of its respective set of nodes, communicates to each other network controller a respective portion of the local characterizing information, and reciprocally receives characterizing information from each other network controller. Thus, each network controller has information of all relevant links of the network. The portion of local characterizing information sent from a first network controller to a second network controller is determined according to a predefined level of affinity between the first network controller and the second network controller. The predefined level of affinity may be specified by a network administrator.

A network controller determines a route set from each node of a designated set of nodes to each other node of the network, rearranges the route set into a set of ranked routes, and communicates the set of ranked routes to respective nodes of the designated set of nodes. The characterizing information of a link may include a metric of the link and an operating state of the link. A metric may be determined according to cost and/or performance-related factors such as propagation delay along the link.

The nodes of the network are partitioned into nodal domains, based on geographic proximity or according to other considerations, where each domain comprises a respective set of ordinary nodes and a principal node coupled to a respective network controller. The network controllers coupled to the principal nodes of the nodal domains may be interconnected in a mesh structure where each network controller has a direct link to each other network controller for exchanging control information. Alternatively, the principal nodes may be interconnected in a mesh structure and the network controllers communicate through their respective principal nodes.

A mesh structure of network controllers or a mesh structure of principal nodes, may be effected through a spectral router having a wavelength division multiplexed (WDM) link to each network controller or to each principal node. Each node has a respective node controller configured to determine an operating state of a link emanating from the node, or an operating state of a link terminating at the node, and report a change of the operating state to a respective network controller. A network controller may be further configured to determine identifiers of routes, emanating from its respective set of nodes, which traverse a selected link anywhere in the network and determine a specific node from which the selected link emanates, or at which the selected link terminates. The network controller further communicates the identifiers to a foreign network controller which is communicatively coupled to the specific node.

In accordance with another aspect, the present invention provides a method of distributed determination of end-to-end routes in a communications network having a large number of nodes. The method is based on using a set of network controllers where each network controller controls a respective set of nodes, called a set of local nodes, of the network nodes. The allocation of nodes to the individual network controllers may be based on mutual proximity or other considerations such as administrative constraints.

The network controllers selectively exchange characterizing information of links emanating from nodes of their respective local nodes. Thus, each network controller possesses relevant link-characterizing information for the entire network and may determine a generic route set from each node of its local nodes to each other node of the network. The exchange of link-characterization information is realized by each network controller acquiring characterizing information of each link emanating from each node of its local nodes and communicating to each other network controller a respective portion of the characterizing information.

The method further comprises defining a level of affinity between each network controller and each other network controller. Each network controller may then determine a respective portion of characterizing information to communicate to each other network controller according to a respective level of affinity.

A network controller may determine an inverse routing table identifying, for each link encountered in its generic route set, all routes originating from its local nodes which traverse the link under consideration. In operation, the network controller may receive state-transition information of a selected link, identify at least one route traversing the selected link using the inverse routing table, and determine availability of the at least one route according to the state-transition information.

A network controller may acquire state-transition information of each link emanating from each node of its local nodes and periodically communicate the state-transition information to selected network controllers which are permitted to receive the state-transition information. The state-transition information may be communicated during dedicated time intervals of selected network paths. A first network controller may determine identifiers of all routes which originate from its local nodes and traverse a selected link, identify a second network controller which controls the selected link, and send the identifiers to the second network controller. The second network controller may detect a state change of the selected link and communicate the state change to the first network controller. To determine link states, a node may send continuity signals through a direct link to a neighbouring node. The neighbouring node determines a current state of the direct link based on successful acquisition of the continuity signals. Alternatively, the neighbouring node may send confirmation of successful acquisition of the continuity signals through any route to the sending node. The sending node then determines a current state of the direct link based on receiving the confirmation.

The method further uses a recursive process to rank the routes of each route set according to an intersection level of each route with each other route of lower cost. A network controller implements processor-executable set of instructions which determines a cost of each route of a generic route set, initialize a set of ranked routes as an empty set, and transfer a route of least cost from the generic route set to the set of ranked routes. The cost of each remaining route in the generic route set is then increased by an amount determined according to an intersection level of each remaining route with routes of lower cost. The transfer of a route from the generic route set to the set of ranked routes is repeated until the generic route set becomes empty or the set of ranked routes contains a preselected number of routes considered to be sufficient for the routing function. Computationally, the cost of a remaining route in the generic route set is increased according to the intersection level of the remaining route and a latest transferred least-cost route. The process of determining the intersection-level cost increment may be based on designating a link-specific cost increment to each link of the plurality of links, identifying common links of a route of the generic route set and a route of the set of ranked routes, and adding respective link-specific cost increments of the common links to the cost of the route of the generic route set.

A preferred implementation of the process of determining an intersection level of a first route and a second route includes processes of: indexing the network nodes as 0 to (N−1), N being a number of network nodes, N>2; mapping links of the first route on an array of N null entries; and comparing an index of each link of the second route with an entry of the array.

In accordance with a further aspect, the present invention provides a method of distributed determination of routes in a network. The network nodes are partitioned into a number of node sets, each node set having a respective number of nodes and assigned a respective network controller having a processor and a memory device storing processor-executable instructions for implementing the method. Preferably, each network controller communicates with each other network controller through a respective dedicated path. The network controller of a node set forms a table identifying and characterizing each link emanating from each node of the node set, communicates the table to other network controllers of other node sets, and reciprocally receives other tables from the other network controllers. For a selected originating node of the node set assigned to the network controller, the network controller identifies $n^{th}$-tier, n>1, adjacent nodes of the selected originating node and forms a particular route set to a selected destination node, where a route of a route set comprises a series of links from the selected originating node to an $n^{th}$-tier adjacent node and a shortest route from each $n^{th}$-tier adjacent node to the selected destination node. The shortest route is determined using the acquired links' information. Preferably, the shortest route is determined according to a method which computes shortest paths from a source node to all other nodes of the plurality of nodes. The $n^{th}$-tier adjacent nodes exclude any node traversed by any $m^{th}$-tier adjacent nodes, where m<n. This restriction is applied to avoid redundant computations. The network controller further determines an independent cost of each route of a route set and ranks routes of the route set according to the independent cost. Preferably, the network controller determines a contention cost of each route of the route set and ranks routes of the route set according to a total cost of each route which includes the independent cost and a contention cost. The contention cost of a route may be determined as a function of a number of links of the route which are common in all preceding routes of a respective set of ranked routes. The contention cost may be determined recursively where a contention cost of a specific route beyond a first route in a set of ranked routes depends on all preceding routes of the set of ranked routes. The contention cost increases with each transfer of a route from the generic route set to the set of ranked routes.

In accordance with a further aspect, the present invention provides a method of distributed control of a network. The network has multiple nodes and each node has a respective node controller which may be accessed through a switching mechanism of the node or through a bus connecting the node controller and ports of the node.

The method comprises partitioning the network nodes into node groups and providing a respective network controller of a set of network controllers to each node group. The network controllers are interconnected in a full-mesh structure using a cross connector which may be implemented using a spectral-temporal connector. Each network controller receives characterizing information of each link emanating from the nodes of its node group and sends the information to each other network controller through the cross connector. Each network controller determines a route set from each node of its node group to each other node of the network. A network controller may determine an inverse routing table indicating for each link included in any route set identifiers of all routes which traverse the link or identifiers of nodes originating routes which traverse the link.

In a first control scheme, the switching mechanism of a selected node, called a principal node, of a node group dedicates at least one dual port for connecting to the network controller of the node group. The network controller receives, through the switching mechanism, characterizing information of each link emanating from the node group, as well as characterizing link information from other network controllers. The network controller also disseminates control data to constituent nodes of its node group and to other network controllers through the switching mechanism.

In a second control scheme, a specific network controller connects through a dual link to a node controller of a host node of its node group for exchanging control information with each node of its node group. The control information includes characterizing information of each link emanating from each node of the specific node group as well as nodal routing tables determined at the specific network controller. Control information from other network controllers is communicated to the specific network controller through a downstream control channel. Control information to the other network controllers is disseminated to the other network controllers through an upstream control channel. The upstream control channel may be embedded in a wavelength-division-multiplexed (WDM) output link of the host node and the downstream control channel may be embedded in an input WDM link of the host node.

The method further comprises sending from each network controller to each other network controller, through a cross connector, state-change information pertinent to links connecting to a respective set of nodes. Upon receiving an indication of state-change of a specific link, a network controller identifies routes which include the specific link and updates a state of any identified route according to the indication of state change.

The method further comprises rearranging, at a network controller of a node group, routes of each route set originating from the node group into a set of ranked routes and communicating the set of ranked routes to each node of the node group.

The method further comprises exchanging time indications between a master time indicator coupled to the cross connector and a slave time indicator coupled to each network controller for time-aligning the network controllers to the master time controller.

In accordance with another aspect, the present invention provides a system of distributed control of a network having multiple nodes. The system comprises a plurality of network controllers and a cross connector interconnecting the network controllers. Each network controller is dedicated to a respective group of nodes and is configured to acquire characterizing information of each link emanating from each node of the respective group of nodes and communicate the characterizing information to each other network controller through the cross connector. Thus, each network controller has characterizing information of each link of the entire network which is used to determine a route set from each node of its respective group of nodes to each other node of the entire network. A network controller may then determine, for each link included in a route set, identifiers of specific routes which traverse the link, or identifiers of nodes from which the specific routes originate.

Each network controller is further configured to communicate a respective self-identifier together with notifications of a state change of links emanating from its node group to each other network controller. A network controller which receives notification of a state change of a particular link from another network controller identifies routes which traverse the particular link and may redirect data to other routes where necessary.

In accordance with a further aspect, the present invention provides network controllers in a network having multiple nodes interconnected by links. Each network controller is dedicated to a respective group of nodes of the network nodes and is configured to collect local characterizing information from its constituent nodes and communicate the local data to each other network controller. The local data includes characterizing information of each link emanating from each node of a respective group of nodes. Thus, each network controller has sufficient information to determine a generic route set from each node of its node group to each other node of the entire network. A network controller may rearrange routes of a route set into a set of ranked routes and communicate the set of ranked routes, rather than the generic route set, to a respective constituent node. A network controller may also determine an inverse routing table which identifies all routes traversing a specific link and originating from its group of nodes. Thus, upon receiving state-transition information of the specific link, the network controller identifies at least one route traversing the specific link and determines availability, or otherwise, of the at least one route.

A network controller may have a direct link to each other network controller or a dual link to a cross connector which may cyclically connect the network controller to each other network controller. A cross connector may be implemented as a temporal rotator or a spectral-temporal connector.

BRIEF DESCRIPTION OF THE DRAWINGS

Features and implementations of the present invention will be further described with reference to the accompanying exemplary drawings, in which:

FIG. 7 and FIG. 8 illustrate processes of determining intersection levels and updating cost of routes according to intersection levels with other routes;

REFERENCE NUMERALS

Figure 1:
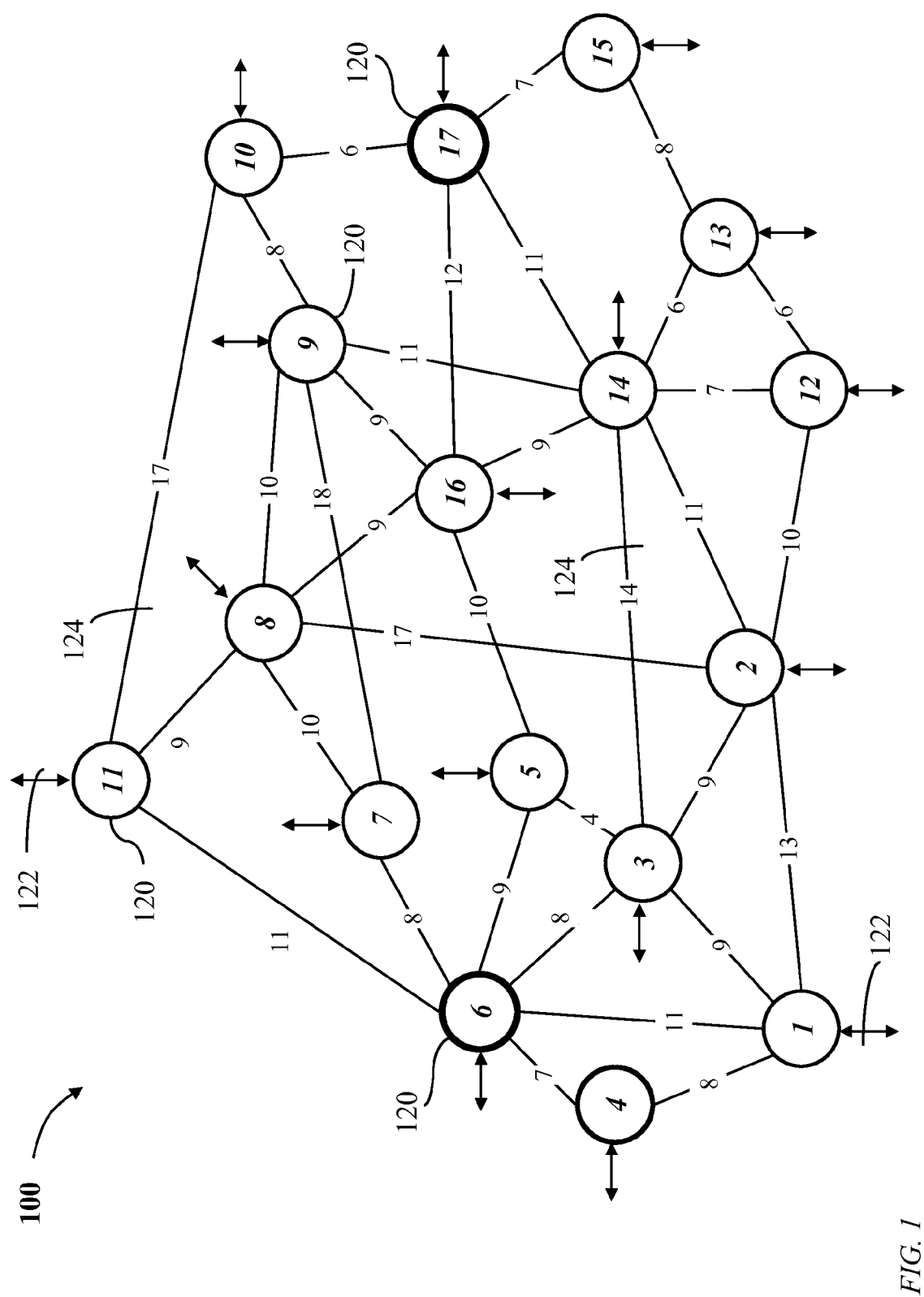
FIG. 1 is a schematic of an exemplary communications network for use in an embodiment of the present invention.

A reference numeral may refer to items of a same type either individually or collectively. A reference numeral may be further indexed to distinguish individual items of a same type.

100: An exemplary network for illustration of a method of determining intersection levels of routes within a route set
120: A node in network 100
122: Dual links connecting nodes 120 to respective data sources and sinks
124: Dual links interconnecting nodes 120
300: A flow chart outlining a process of determining route sets in a network
310: A process of link characterization
320: A process of node-pair selection
330: A process of identifying $n^{th}$-tier adjacent nodes
340: A process of determining shortest paths
350: A process of determining route sets based on processes 330 and 340
410: A process of transferring a least-cost route to a set of selected routes
420: A criterion for determining revisiting processes 410
430: A process of adjusting costs of routes
440: A process of communicating the set of selected routes
500: A flow chart outlining a procedure for ranking routes within a route set
504: Initial set of ranked routes 510: A process of determining an initial cost of each route in a route set
520-560: Processes of recursively updating costs of routes of a route set based on mutual routes' intersection
610, 615, 620, 625, 630, 635, 640, 645, 650, 655, 660, 680: Processes of ranking a route set
710: An array indicating indices of the nodes of network 100
720: An array indicating a route set of the generic route set 600
730: An array indicating route labels
740: an array containing updated costs of the individual routes
1105: A network domain
1110: An ordinary node
1120: A principal node
1200: Network of ordinary nodes 1110 and principal nodes 1120
1212: A dual link connecting two nodes within a network domain 1105
1214: A dual link connecting two nodes of different network domains 1105
1216: A dual link connecting two principal nodes in network 1200
1310: An ordinary node of a first domain
1312: An ordinary node of a second domain
1320: A principal node of a first domain
1322: A principal node of a second domain
1324: A dual link connecting ordinary node 1310 and ordinary node 1312
1326: A dual link connecting principal node 1320 and principal node 1322
1400: Network of ordinary nodes 1110 and principal nodes 1120 where cross connectors interconnect ordinary nodes 1110 and a cross connector interconnects principal nodes of different domains
1440: Spectral router
1450: A WDM link connecting a principal node 1120 to cross connector 1480 in network 1400
1460: A cross connector interconnecting ordinary nodes of network 1400
1480: An inter-domain cross connector interconnecting principal nodes of network 1400
1520: Passive temporal rotator interconnecting principal nodes
1550: Links from passive temporal rotator 1520 to principal nodes
1600: Network of ordinary nodes 1110 and principal nodes 1120 where a passive temporal rotator 1520 interconnects principal nodes
1612: Link between ordinary nodes of a same domain
1614: Link between ordinary nodes of different domains
1700: An implementation of an ordinary node 1110
1710: A switching mechanism (switch fabric)
1720: Channels from data sources
1721: Input ports connecting to channels 1720
1722: Output ports connecting to channels 1724
1724: Channels to data sinks
1730: Channels from other nodes
1731: Input ports connecting to channels 1730
1732: Output ports connecting to channels 1734
1734: Channels to other nodes
1740: Node controller
1741: Input port of switching mechanism receiving control data from node controller 1740
1742: Output port of switching mechanism transmitting control data to node controller 1740
1800: An implementation of a principal node 1120
1810: Switching mechanism
1820: Channels from data sources
1821: Input ports connecting to channels 1820
1822: Output ports connecting to channels 1824
1824: Channels to data sinks
1830: Channels from other nodes
1831: Input ports connecting to channels 1830
1832: Output ports connecting to channels 1834
1834: Channels to other nodes
1840: Nodal controller coupled to switching mechanism 1810
1841: Input port of switching mechanism 1810 connecting to a channel from node controller
1842: Output port of switching mechanism 1810 connecting to a channel to node controller
1843: Channel from switching mechanism 1810 to node controller 1840
1844: Channel from node controller 1840 to switching mechanism 1810
1850: Network controller coupled to switching mechanism 1810, node controller 1840, and a cross connector
1851: Input port of switching mechanism 1810 connecting to a channel from network controller
1852: Output port of switching mechanism 1810 connecting to a channel to network controller
1853: Channel from switching mechanism 1810 to network controller 1850
1854: Channel from network controller 1850 to switching mechanism 1810
1855: Dual channel from node controller 1840 to network controller 1850
1856: Link from inter-domain cross connector 1480 or 2380 to network controller 1850, the link may comprise a single channel
1858: Link from network controller 1850 to inter-domain cross connector 1480 or 2380, the link may comprise a single channel
1890: Slave time indicator coupled to network controller 1850
1921: Switched path from an input port 1821 to an output port 1822
1922: Switched path from an input port 1821 to an output port 1832
1923: Switched path from an input port 1821 to node controller 1840
1931: Switched path from an input port 1831 to an output port 1822
1932: Switched path from an input port 1831 to an output port 1832
1933: Switched path from an input port 1831 to node controller 1840
1934: Switched path from an input port 1831 to network controller 1850
1941: Switched path from node controller 1840 to an output port 1822
1942: Switched path from node controller 1840 to an output port 1832
1944: Switched path from node controller 1840 to network controller 1850
1952: Switched path from network controller to an output port 1832
2000: A cross connector using a spectral-temporal connector with a time indicator
2010: bufferless input ports of rotator 2020
2020: Bufferless temporal rotator
2030: bufferless output ports of rotator 2020
2040: Timing circuit 2050: Master time indicator
2100: Spectral-temporal connector
2110: WDM input links
2116: Input channels of connector module
2120: Spectral demultiplexers
2125: Group of input channels 2116
2135: Group of WDM input links 510
2140: Temporal data rotator
2145: Connector module
2146: An output channel connecting a temporal rotator 2140 to a spectral multiplexer 2150
2150: Spectral multiplexers
2155: A set of output channels 2146 comprising one output channel 2146 from each temporal rotator 2140 of a connector module 2145
2180: WDM output links
2200: Network partitioned into network domains
2205: Network domain
2210: An ordinary node
2214: A link interconnecting ordinary nodes of different network domains
2220: A principal node
2222: A set of links carrying connectivity data from a specific principal node 2220 to other principal nodes 2220
2224: A set of links carrying foreign connectivity data of other network domains to a particular principal node
2300: Interconnection of controllers of network 2200
2310: Node controller of an ordinary node 2210
2312: Dual control path between a node controller 2310 and a respective network controller 2320
2320: Network controller of a specific network domain coupled to a principal node
2322: Dual WDM link between a network controller 2320 and cyclical inter-domain cross connector 2380
2350: Master time indicator
2380: Cyclical inter-domain cross connector
2404: Node controllers of ordinary nodes of a specific network domain, referenced as "local node controllers"
2406: Network controllers 2320 of other network domains, referenced as "foreign network controllers"
2410: Link-characterization data of a specific network domain comprising at least one metric of at least one link of the specific network domain
2412: Instant of time of receiving link-characterization data 2410 at the specific network controller
2414: Instant of time of transmitting link-characterization data 2410 to foreign network controllers
2416: Instant of time of receiving Link-characterization data 2420
2420: Link-characterization data of other network domains received at the specific network controller from foreign network controllers
2425: Computation time interval of nodal routing tables 2430 at the specific network controller
2428: Instant of time of starting to transmit nodal routing tables 2430 to local node controllers
2430: Nodal routing tables including route sets of routes originating from nodes of the specific network domain to all nodes of the network computed by the specific network controller
2435: Computation time interval of the nodal routing-table inversion 2440 at the specific network controller
2438: Instant of time of starting to transmit the nodal routing-table inversion 2440 to local node controllers
2440: Inversion of nodal routing tables 2430 computed by the specific network controller 2442: Instant of time of receiving local-link state-change data 2450
2444: Instant of time of starting to transmit local-link state-change data to foreign network controllers 2406
2446: Instant of time of starting to receive foreign-link state-change data 2460
2448: Instant of time of starting to transmit foreign-link stage-change data 2460 to local nodes controllers 2404
2450: Link-state-information received at the specific network controller from ordinary nodes of the specific network domain
2460: Link-state-change information received at the specific network controller from foreign network controllers
2465: Computation time interval of identifying originating local nodes of specific routes which traverse a link—local or foreign—experiencing state change
2480: Instant of time of starting to transmit a list of the specific routes to respective originating nodes
2490: List of specific routes traversing a link experiencing state change sorted according to respective originating nodes
2500: Flow chart depicting a system of distributed computation of routing and link-state information in the global networks of FIG. 12, 13, or 14
2512: Process of acquiring local link-state characterization within a network domain
2514: Process of sending local link-state characterization to foreign network controllers
2516: Process of receiving foreign-link characterization information (thus, process 2514 and
2516 result in exchange of link-state characterization information among all network controllers)
2525: Computation of partial routing table comprising route sets of routes originating from nodes of a network domain
2528: Distribution of node-specific nodal routing tables to individual nodes
2534: Identification of links included in the partial routing table
2535: Computation of an inversion of the partial routing table
2538: Distribution of routing-table inversion
2542: Process of receiving local-link state-change information 2450 from local nodes
2544: Process of notifying foreign network controllers of local-link state changes 2450
2546: Process of receiving foreign-link state-change information 2460
2590: Process of identifying routes originating from local nodes and traversing a link (local or foreign) experiencing state change
2602: Index of a time slot of a slotted time frame
2610: Array identifying an output port 2030 of spectral-temporal connector 2000 receiving timing data from timing circuit 2040 during each time slot of a slotted time frame
2620: Array identifying an output port 2030 of rotator 2020 receiving control data from a principal node through an input port 2010 during each time slot of a slotted time frame
2680: Timing data from principal nodes to timing circuit 2040
2690: control data (control messages) from a network controller of a principal node to a network controller of another principal node
2702: Index of a time slot of a slotted time frame 2710: Array identifying an input port 2010 of rotator 2020 sending timing data to timing circuit 2040 during each time slot of a slotted time frame 2720: Array identifying an input port 2010 of rotator 2020 sending control data to a principal node through an output port 2030 during each time slot of a slotted time frame.

2780: Timing data from timing circuit 2040 to principal nodes

2790: control data (control messages) from a principal node

2805: Network domain

2820: Network controller of a network domain 2805

2825, 2830, 2835: Partial topology data of a network domain 2805

2840: Full topology data of a network domain 2805

2900: Control network

2910: Basic node connecting to spectral-temporal connector 2100 of control network 2900

2912: Dual access link

2920: Node of higher capacity connecting to spectral-temporal connector 2100 of control network 2900

2948: Dual link connecting a node 2910 or 2920 to the spectral-temporal connector 2100 of control network 2900

2980: Central controller coupled to the spectral-temporal connector 2100 of control network 2900

3000: A cross connector employing an electronic spectral-temporal connector with buffers preceding input ports 3002: Channels from network controllers to spectral-temporal connector 3020

3005: Optical-electrical converter

3010: Input ports of electronic spectral-temporal connector 3020

3012: Buffer

3014: Buffer section

3020: Electronic spectral-temporal connector

3030: Output ports of spectral-temporal connector 3020

3032: Channels to network controllers through electrical-optical converters

3035: Electrical-optical converter

TERMINOLOGY

Terms used in the present application are defined below.

Global network: A network comprising a large number of nodes covering a wide geographical area is traditionally referenced as a global network.

Network domain: A global network may be partitioned into a number of network domains, each network domain encompassing a respective number of nodes, called a nodal domain. For example, a global network of 34000 nodes may be partitioned into 64 network domains, each network domain having a respective number of nodes totalling 34000. The network domains may be subject to different administrative regulations due to, for example, different ownership or multinational coverage.

Node: A routing-switching device (a router or a packet switch) is herein referenced as a node. Signal-processing devices such as repeaters are not labelled herein as nodes and are not considered in the present application.

Ordinary node: A node routing data to adjacent nodes is herein referenced as an ordinary node. An ordinary node may connect to data sources and data sinks.

Principal node: A node within a network domain handling exchange of routing data and link-state data in addition to functioning as an ordinary node is herein referenced as a principal node.

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "node controller", "switch controller", "domain controller", "network controller", or "central controller" is a hardware entity.

Node controller: Each node, whether an ordinary node or a principal node, has a node controller for scheduling and establishing paths from input ports to output ports of the node.

Network controller: A network controller is coupled to a principal node and is configured to exchange connectivity data and link-state data with network controllers of other principal nodes. A principal node may have a node controller and a network controller.

Software instructions: The term refers to processor-executable instructions which may be applied to cause a processor to perform specific functions.

Configuring a controller: The term refers to an action of installing appropriate software for a specific function.

Inter-domain affinity: Exchange of topology data between two network domains may be controlled according to a predefined relationship of the two network domains. For example, two network domains having a common owner would have high mutual affinity and there may be no restriction on the exchange of topology information. Otherwise, the topology data exchanged may be limited by administrators of two network domains having lower mutual affinity.

Level of affinity: A level of affinity between a first network domain and a second network domain defines the extent of local characterizing information of the first network domain that may be communicated to the second network domain. Each network domain has at least one network controller and a "level of affinity" between two network controllers of different network domains is the level of affinity between the two network domains.

Cross connector: The term is used herein to refer to a device having multiple input ports and multiple output ports where each input port cyclically connects to each output port during a repetitive time frame.

Channel: A directional channel is a communication path from a transmitter to a receiver. A dual channel between a first port having a transmitter and a receiver and a second port having a transmitter and a receiver comprises a directional channel from the transmitter of the first port to the receiver of the second port and a directional channel from the transmitter of the second port to the receiver of the first port. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Local link: A link emanating from any node of a particular network domain is referenced as a "local link" with respect to the particular network domain.

Foreign link: A link connecting any two nodes outside a particular network domain is referenced as a "foreign link" with respect to the particular network domain.

Local connectivity data: The term refers to data identifying links emanating from each node of a specific network domain.

Foreign connectivity data: The term refers to data identifying links emanating from each node of a network domain other than a specific network domain under consideration.

Foreign network controller: The term refers to a network controller of a network domain other than a specific network domain under consideration.

Topology data: The term refers to identifiers of network nodes as well as information relevant to links interconnecting the network nodes.

Directional link: A link from a first node to a second node is a directional link. Likewise, a link from the second node to the first node is another directional link. The two directional links form a dual link connecting the two nodes.

Directed node pair: two nodes considered in a specific order form a directed node pair. This designation is important; a set of routes from a first node to a second node may traverse paths that differ from paths traversed by a set of routes from the second node to the first node.

Diameter of network: The diameter of a network is a metric indicative of the number of intermediate nodes along the shortest path from one node to another. The number of intermediate nodes may differ significantly from one node pair to another. Thus, the metric may be based on an extreme value of the number of intermediate nodes, a mean value, or a value exceeded by shortest paths of a predefined proportion of node pairs.

Route set: A number of candidate routes from a first node to a second node constitute a "route set".

Routing table: A routing table indicates a route set for each directed node pair.

Inverse routing table: An inverse routing table identifies routes which traverse a specific link.

Routes interdependence: Any two routes which traverse at least one common link are said to be "interdependent routes". The number of common links defines an intersection level (also called "interference level" or "interdependence level"). Any two routes which do not traverse a common link are said to be "independent routes".

Spectral router: A spectral router (also called "wavelength router") is a passive device connecting a number of input WDM links to a number of output WDM links where each output WDM link carries a spectral band from each input WDM link.

Spectral-temporal connector: A spectral-temporal connector connects multi-channel input links to multi-channel output links so that each output link receives a time-limited signal from each input link.

Processor-executable instructions causing respective processors to implement the processes illustrated in FIG. 3, FIG. 4, FIG. 6, and FIG. 25 may be stored in a processor-readable media such as floppy disks, hard disks, optical disks, Flash ROMS, non-volatile ROM, and RAM. A variety of processors, such as microprocessors, digital signal processors, and gate arrays, may be employed.

DETAILED DESCRIPTION

FIG. 1 is a schematic of an exemplary communications network 100 of nodes 120, individually identified as nodes 120(1) to 120(17); the number, N, of nodes 120 of the exemplary network is 17. A node 120 may have a dual link 122 to respective data sources and data sinks. The nodes 120 are interconnected through dual links 124 in a partial mesh structure. Each node 120 is represented as a circle indicating an index of the node. FIG. 1 also indicates a "cost" of each dual link 124. Each dual link comprises two directional links and, in the example of FIG. 1, the illustrated cost of a dual link is considered to be the cost of each of its constituent two directional links. Thus, the cost of directional link from node 120(4) to node 120(6), for example, is 7 units and the cost of the directional link from node 120(6) to node 120(4) is also 7 units. In general the cost of a directional link may be determined according to several considerations, such as propagation delay. The costs of the two directional links of a dual link may differ. In accordance with the present invention, a route set is determined for each directional node pair.

Figure 2:
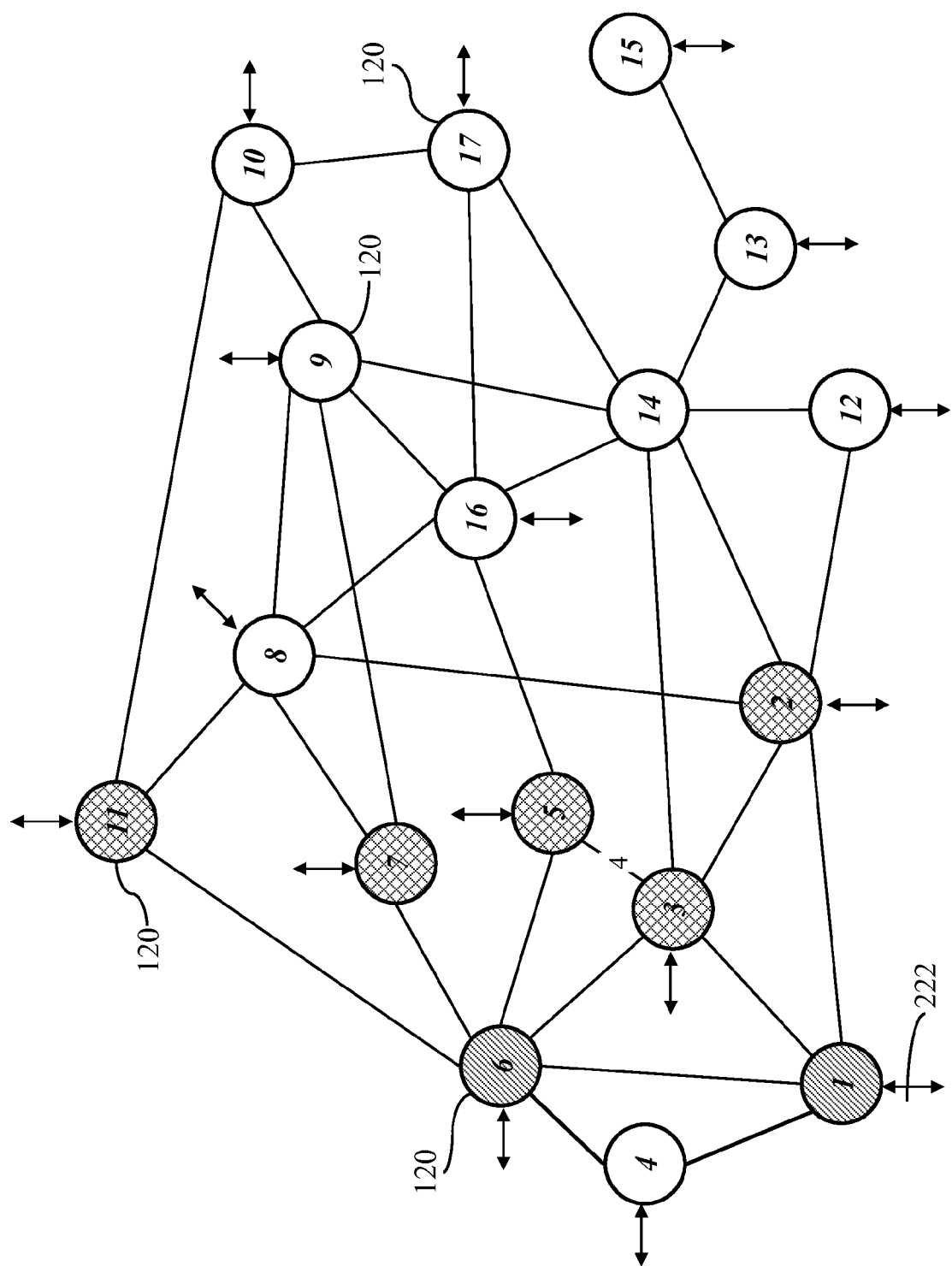
FIG. 2 illustrates first-tier and second-tier neighbouring nodes of a selected node in the network of FIG. 1.

FIG. 2 illustrates first-tier adjacent nodes and second-tier adjacent nodes of a selected source node of the network of FIG. 1. In general, the number of links of the shortest path (least cost path) between a first node 120 and a second node 120 defines an adjacency level of the second node with respect to the first node. If the shortest path from the first node to the second node has n links, n>0, the second node is said to be an $n^{th}$ tier adjacent node of the first node. For example, node 120(6) is a first-tier (n=1) adjacent node of node 120(4), node 120(5) is a second-tier (n=2) adjacent node of node 120(4), and node 120(16) is a third-tier (n=3) adjacent node of node 120(4). Source node 120(4) has two first-tier adjacent nodes {120(1) and 120(6)}, and five second-tier adjacent nodes {120(2), 120(3), 120(5), 120(7), and 120(11)}.

Each node 120 in the network of FIG. 1 may function as a source node, a sink node, a combined source node and sink node, and/or a tandem (transit) node.

Figure 3:
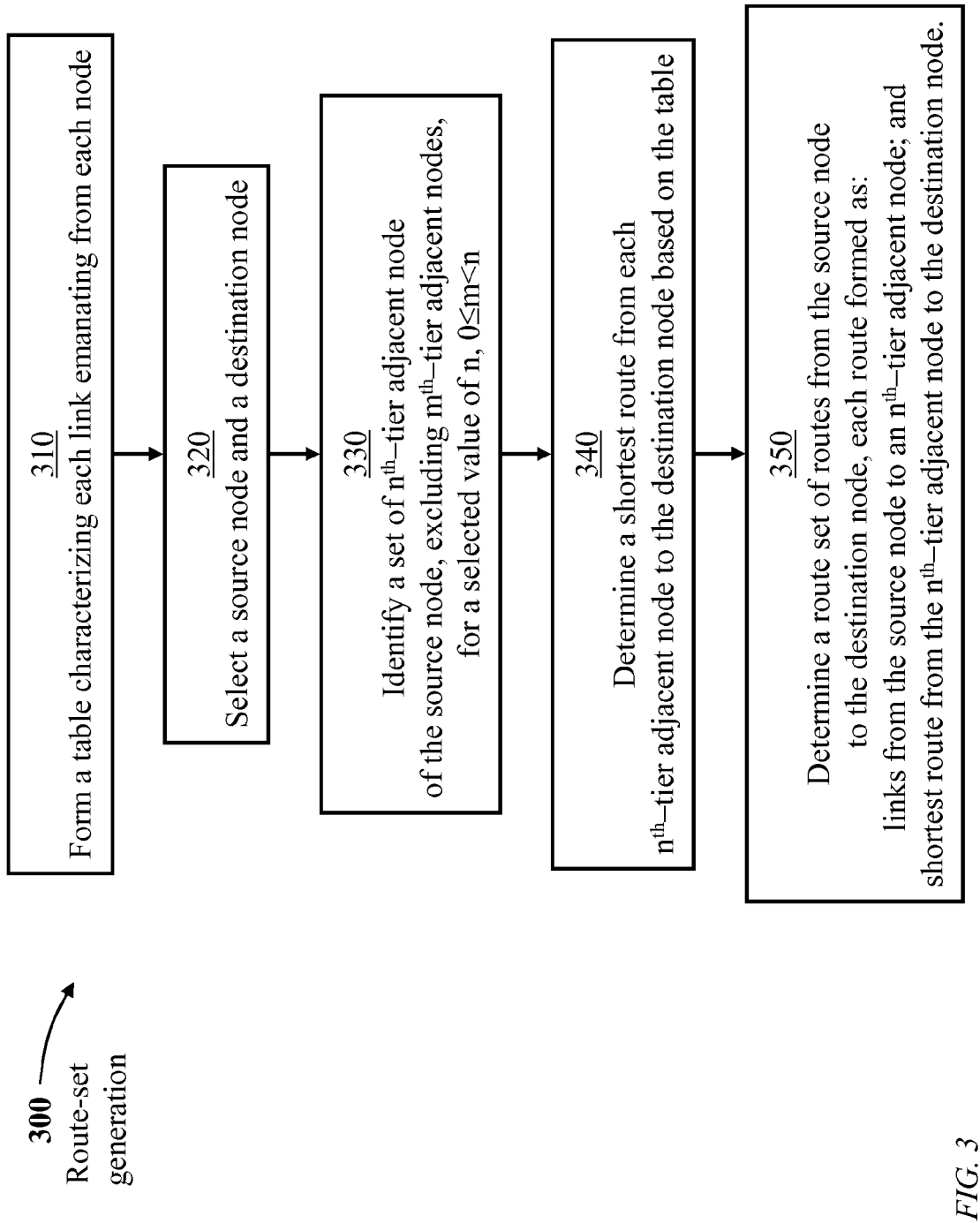
FIG. 3 is a flow chart describing a process of generating route sets, in accordance with an embodiment of the present invention.

FIG. 3 is a flow chart 300 depicting a method of generating route sets for each directed node pair in a network having a plurality of nodes. A metric is associated with each directional link in the network. The metric may be based on link cost, including link termination circuitry at nodes (routers/switches), propagation delay along the link, and any other physical or administrative consideration. A link-metric table may then be formed (process 310) to be used in computing a figure of merit for each end-to-end route within the network. A route set may be determined for each directional node-pair. Staring with a selected source node and a selected sink node defining a directional node pair (process 320), a set of $n^{th}$-tier adjacent nodes of the selected source node is determined (process 330), with n varying between 1 and a prescribed maximum which may depend on the diameter of the network. It may be sufficient to limit n to 2. Thus, the selection of adjacent nodes starts with first-tier nodes, i.e., immediately adjacent nodes of the source node. In the network of FIG. 2, a source node 120(4), for example, has two first-tier adjacent nodes 120(1) and 120(6). The shortest path from each first-tier adjacent node to a destination node 120(17), for example, is then determined (process 340) using any of known methods. Thus, a set of first-tier routes is formed (process 350), each first-tier route including a link to a respective first-tier adjacent node 120(1) or 120(6) of source node 120(4), and a series of links to destination node 120(17) determined according the selected shortest-path determination method.

The intermediate nodes of FIG. 2 include five second-tier adjacent nodes 120(2), 120(3), 120(5), 120(7), and 120(11). Process 330 is repeated to select second-tier adjacent nodes (n=2). Any second-tier node included in a first-tier route may be excluded to avoid redundant computation. The shortest path from each selected second-tier node to the destination node 120(17) is then determined (process 340). Thus, a set of second-tier routes is formed (process 350), each second-tier route including two concatenated links to a respective second-tier adjacent node, and a series of links to destination determined according to the selected shortest-path determination method. With n limited to 2, the set of first-tier routes and the set of second-tier routes form a generic route set for the directed node pair of source node 120(4) and destination node 120(17).

If n is limited to equal 1, the number of routes in a route set would be limited to the number of directly adjacent nodes to a source node, which may be equal to 1. The number of directly adjacent nodes of a source node may vary significantly from one source node to another according to the degree of the source node. For a source node of a small degree, n is preferably selected to be at least 2.

Determining a route set for each node pair in a network may necessitate that the process 340 of determining a shortest path be repeated several times for a same destination node. Thus, to avoid repeated calculations, the shortest-path from each node in the network to each other node of the network may be determined a priori and retained to be accessed in executing process 340. The shortest route may be determined according to a method which computes shortest paths from a source node to all other nodes of the plurality of nodes, e.g., using the well-known method of Dijkstra.

Figure 4:
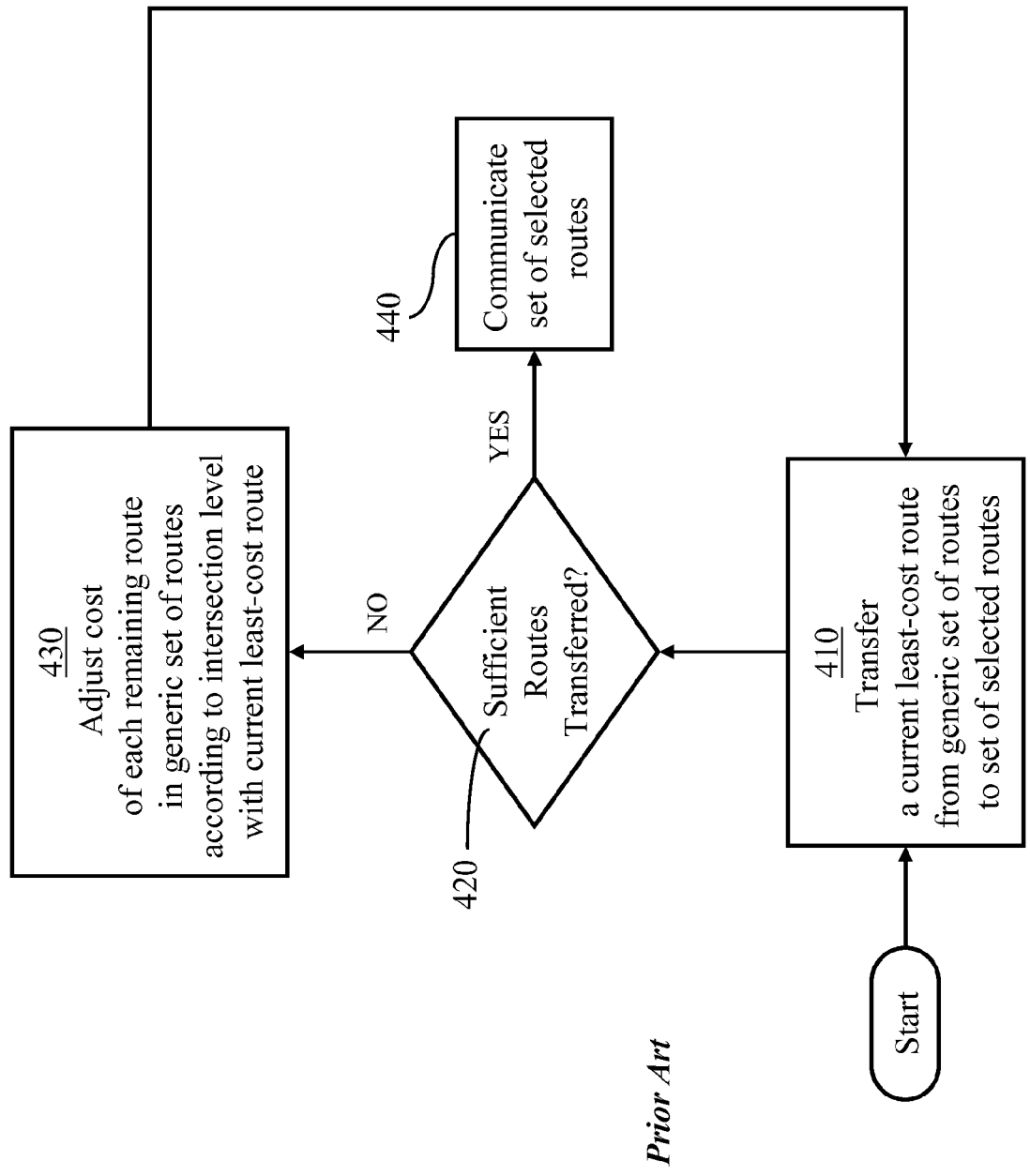
FIG. 4 depicts an overview of a method of ranking routes of a generic route set.

FIG. 4 depicts a prior-art method of ranking routes of a route set according to costs of individual routes and route-intersection levels. A "start" process creates an empty set of selected routes to be gradually populated with identifiers of ranked routes of a specific generic set of routes containing at least two routes. Process 410 identifies a current least-cost route in a generic route set and transfers an identifier of the current least-cost route to a set of selected routes. Process 420 determines whether the set of selected routes contains a number of route identifiers equal to a predetermined preferred number and decides to either revisit process 410 (through process 430) or communicate the set of selected routes to a respective controller (process 440). Process 430 determines an intersection level of each remaining route in the generic route set with the current least-cost route and adjusts the cost of each remaining route accordingly. The predetermined preferred number is less than or equal to the initial number of routes in the specific generic route set. Process 410 is activated a number of times equal to the predetermined preferred number of routes and process 430 is activated a number of times equal to the predetermined preferred number of routes minus 1.

Figure 5:
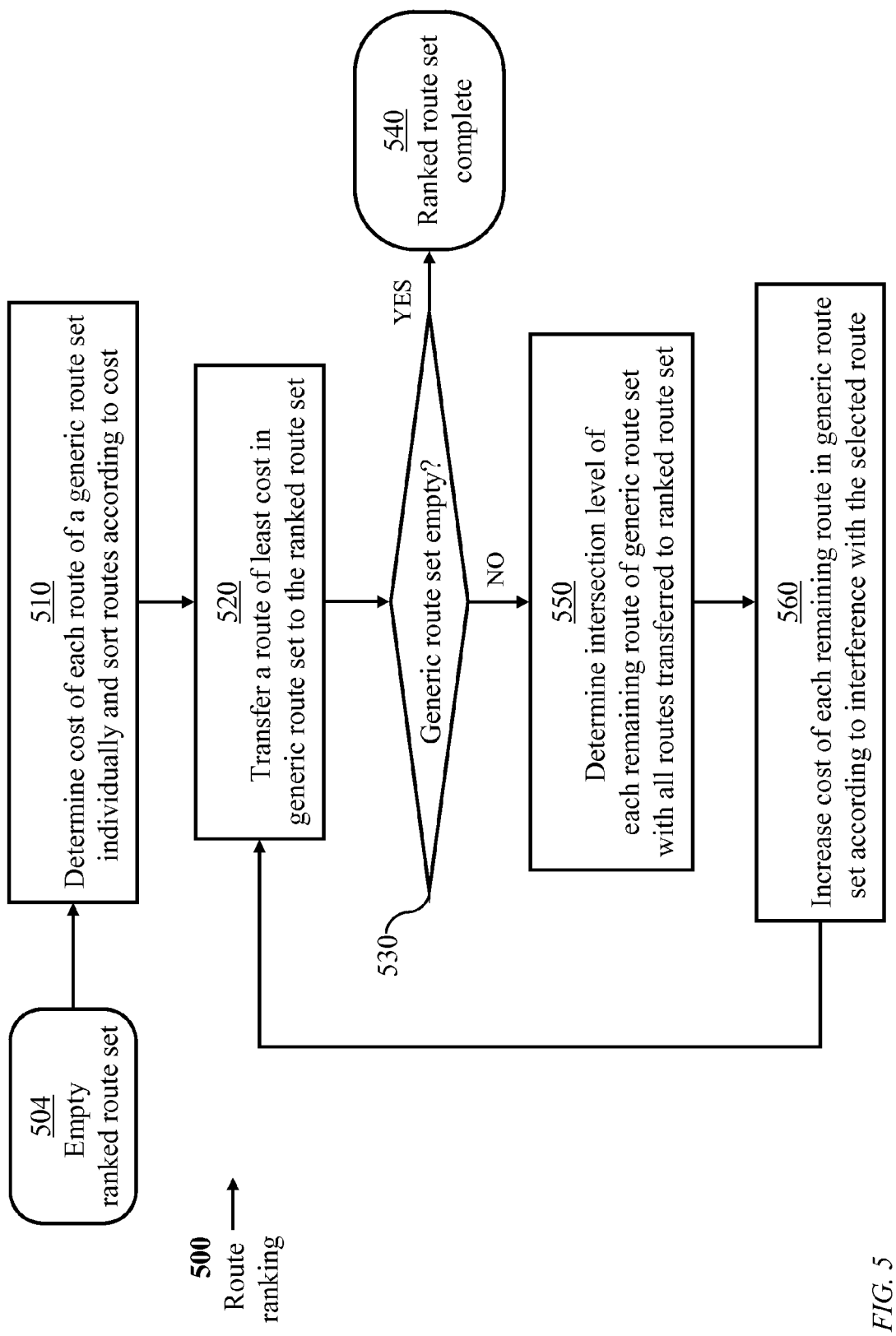
FIG. 5 is a flow chart describing a process of ranking routes in a route set, in accordance with an embodiment of the present invention.

FIG. 5 illustrates a process 500 of ranking routes of a route set according to a figure of merit associated with each route and interdependence of routes. A route set may be determined according to different methods. One method has been described above with reference to FIG. 3. In general, a figure of merit of a route may be based on a number of factors such as cost and propagation delay, and expressed as a normalized dimensionless number determined as a weighted function of relative cost and relative delay. Without loss of generality, normalized route cost may be used as the figure of merit where a lower value of the normalized route cost implies a higher figure of merit.

The routes of a generic route set are logically transferred, one at a time, to a set of ranked routes. It will be clear to a person skilled in the art that only a pointer to a memory block holding route information need be transferred from the generic route set to the set of ranked routes. Initially, the set of ranked routes is designated as empty (reference 504) and the routes of a generic route set are sorted in an ascending order according to cost (process 510). The route of least cost within the generic route set is transferred to the set of ranked routes (process 520). If all routes of the generic route set are transferred, the route-ranking process 500 is considered complete (processes 530, 540). Otherwise, a level of interference (intersection) of each remaining route in the generic route set with all routes transferred to the set of ranked routes is determined (process 550). The cost of each remaining route of the generic route set is tentatively increased according to a respective interference level (process 560). Process 520 is revisited to identify a remaining route in the generic route set of least tentative cost within the generic route set and transfer the identified route to the set of ranked routes. The level of interference of a first route with a second route may be determined as the number of common links traversed by the two routes. Two routes are said to be independent if the level of interference is zero. The level of interference (intersection) of a first route with a subset of routes may be determined as the number of common links traversed by the first route and each of the routes of the subset of routes. The tentative increase of route cost of a remaining route of the generic route set is determined as a respective intersection level with the routes of the set of ranked routes multiplied by a predefined supplementary cost unit. The route-ranking process 500 continues until either all the routes of the generic route set or a predefined number of routes are transferred to the set of ranked routes. Thus, an intersection level cost increment may be applied to a route which shares a link with a preferable route in the same route set.

Table-I indicates a generic route set for a specific directed node pair {120(6) to 120(17)} of the network of FIG. 1. The generic route set includes ten routes, labelled R1 to R10. Each route is defined by indices of nodes 120 along the route. Independent costs of the ten routes are determined individually without considering the intersection of the routes' trajectories. The routes of Table-I are arbitrarily sorted according to cost in an ascending order. The cost of each route, labelled "initial cost", is the sum of costs of the directional links constituting the route. Initially, the costs of routes of a route set are determined independently regardless of the level of intersection of any route with any other route.

To establish a connection from node 120(6) to node 120(17), a controller of node 120(6) may select R1 as a first candidate route. Failure to establish a connection along R1, due to unavailability of sufficient vacancy in any link along R1, would naturally lead to selection of the next route in the sorted list as a candidate route. The routes may be considered sequentially until a connection is established or a connection request is rejected. However, to balance the traffic loads of the network links and reduce processing effort, it is advantageous to route the traffic from a source node to a destination node over non-intersecting routes or over routes of a relatively small intersection level. The intersection level of two routes is the number of common links traversed by the two routes. Two routes are said to be independent if they do not traverse a common link, i.e., if the intersection level is zero. For example, R1, R2, and R3 of Table-I are mutually independent while R5 and R1 have an intersection level of one because both traverse the link {120(16)-120(17)}.

TABLE I

Route-set for directed node pair 120(6) and 120(17)

| Route identifier | Trajectory (indices of nodes 120) | Initial cost |
|---|---|---|
| R1 | 6-5-16-17 | 31 |
| R2 | 6-3-14-17 | 33 |
| R3 | 6-11-10-17 | 34 |
| R4 | 6-5-3-14-17 | 38 |
| R5 | 6-7-8-16-17 | 39 |
| R6 | 6-7-9-10-17 | 40 |
| R7 | 6-11-8-16-17 | 41 |
| R8 | 6-1-3-14-17 | 45 |
| R9 | 6-1-2-14-17 | 46 |
| R10 | 6-4-1-2-14-17 | 50 |

An intersection level of a specific route with a subset of routes is defined herein as the number of links that are common in the specific route and any of the routes of the subset of routes. For example, R4 traverses links {6-5}, {5-3}, {3-14}, {14-7}. R1 traverses links {6-5}, {5-16}, {16-17}. R2 traverses links {6-3}, {3-14}, {14-17}. Thus, R4 and R1 have an intersection level of 1. R4 and R2 have an intersection level of 2. R4 has an intersection level of 3 with the set of R1 and R2.

Figure 6:
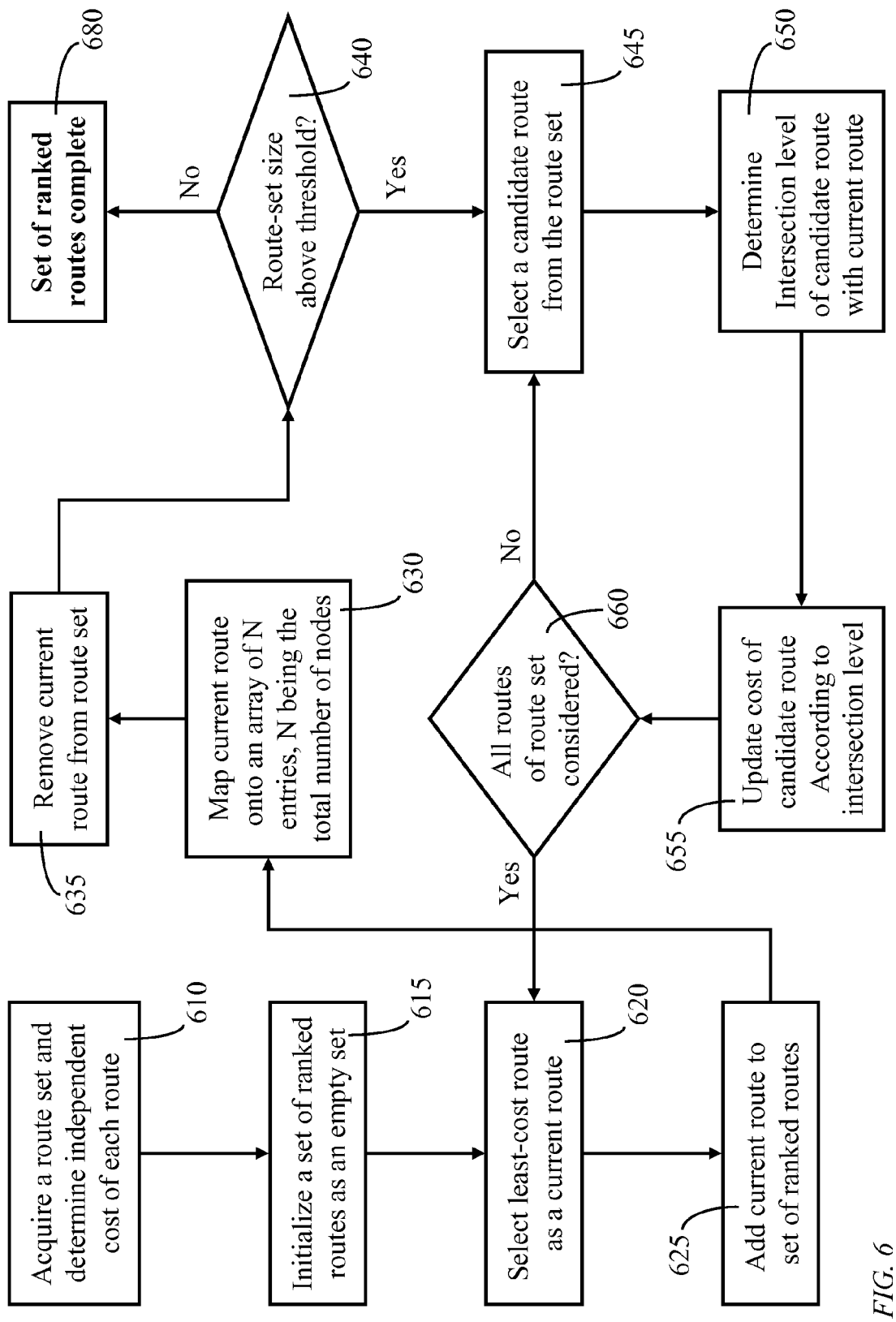
FIG. 6 illustrates an automated method, implemented at a network controller, of ranking routes of a generic route set.

FIG. 6 illustrates an automated method, implemented at a controller having a processor and a memory device storing processor executable instructions, for ranking routes of a generic route set based on individual route cost and routes-intersection levels. The generic route set may be determined according to the method illustrated in FIG. 3 or any other method and an independent cost of each route is determined (process 610). A set of ranked routes is initialized as an empty set (process 615). A recursive process of ranking the routes of the generic route set starts with transferring the route of least cost, called current route, from the generic route set to the set of ranked routes (processes 620 and 625). An array of N null entries, N being the total number of nodes of the network under consideration, is created and the current route is mapped onto the array where, for each successive two nodes along the route, an index of the second node is entered at an array index equal to the index of the first node (process 630). The current route is then removed from the generic route set (process 635). An upper bound of the number of routes to be transferred to the set of ranked routes may be set a priori. Thus, if the number of routes transferred from the generic route set to the set of ranked routes equals the upper bound, the ranking process is terminated and the set of ranked routes is considered complete (processes 640 and 680). Otherwise, the cost of each remaining route in the generic route set is updated according to the level of intersection with the current route. A candidate route is selected from the generic route set (process 645) and the intersection level of the candidate route with the current route is determined (process 650). The cost of the candidate route may then be modified (process 655) according to the intersection level determined in process 650. If it is determined in process 660 that all remaining routes of the generic route set have been considered for cost update, process 620 is revisited to select the least-cost remaining route as a current route to be transferred to the set of ranked routes. Otherwise, if it is determined in process 660 that at least one route of the generic route set has not been considered for cost update, processes 645, 650, and 655 are revisited.

Process 650 of determining an intersection level of two routes may be implemented using any of methods known to a person skilled in the art. Consider a first route having X links, X>1, traversing nodes of indices $m_0, m_1, \ldots, m_{X-1}, m_X$, and a second route having Y links, Y>1, traversing nodes of indices $n_0, n_1, n_{Y-1}, n_Y$. In a preferred implementation of process 650, each entry of an array V of N entries, N being a total number of nodes in a network under consideration, is initialized as a null value and node indices $\{m_1, m_{X-1}, m_X\}$ are entered in array V so that $V(m_0)=m_1$, $V(m_1)=m_2 \ldots$, and $V(m_{X-1})=m_X$, for X>2 (or just $V(m_0)=m_1$ and $V(m_1)=m_2$ if X=2). The number of intersecting links of the two routes is initialized as zero and each condition $V(n_j)=n_{j+i}$, for $0 \le j < Y$, increases the intersection level by 1. If the two routes belong to a same set of routes of a directed node pair, then $m_0=n_0$ and $m_X=N_Y$. The maximum number of intersecting links is the lesser of X and Y. If the first route is a selected route as defined above with reference to FIG. 4, then the cost increment of the second route due to the intersection with the selected route may be determined as the number of intersecting links multiplied by a predefined cost-increment unit. Other rules for determining a cost increment due to intersection may be devised.

Figure 8:
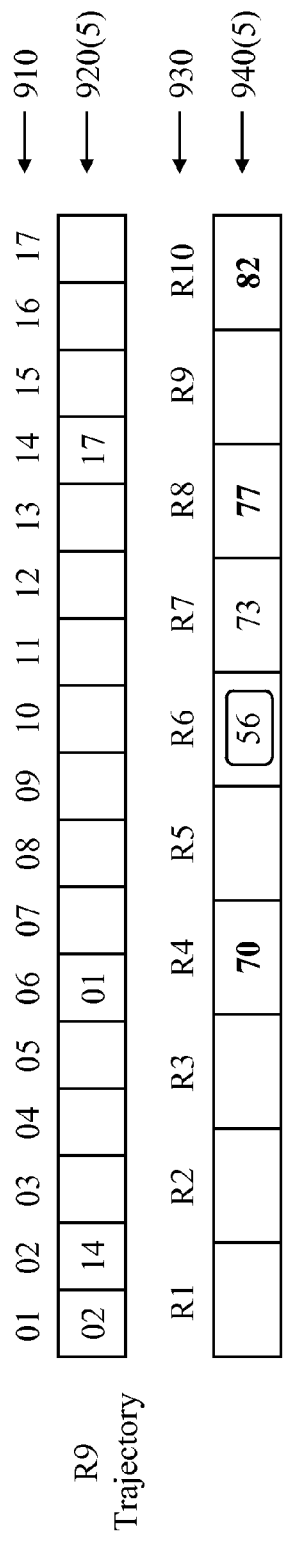
Figure 8:
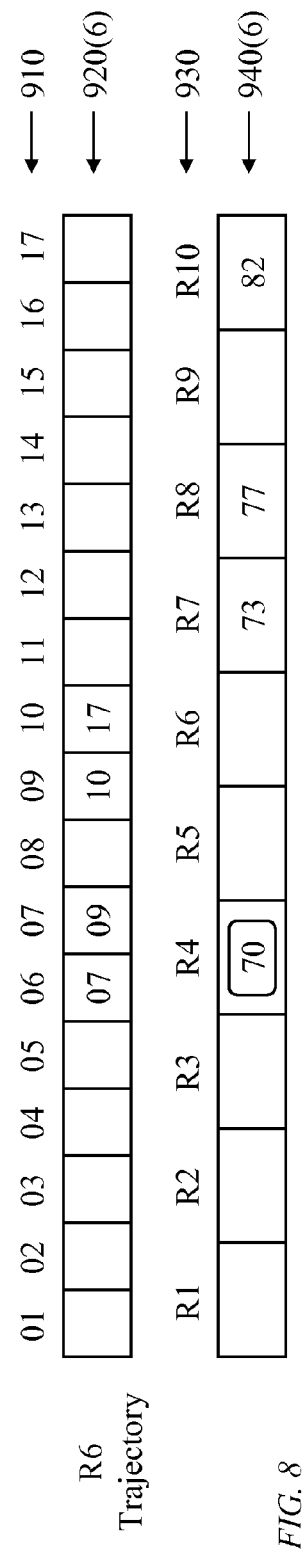

FIG. 7 and FIG. 8 illustrate the processes of determining intersection levels and updating cost of routes according to intersection levels with other routes. Each array 720 has N entries (N=17) and corresponds to one of the routes of the generic route set of directed node-pair {120(6)-120(17)}. The indices of the 17 nodes 120 of network 100 are listed in arrays 710. Each entry in each array 720 is initialized to a null value; for example a zero since the nodes 120 are indexed as 1 to 17. In FIG. 7, a null value is indicated as a blank entry. The directional links of each route are then marked on a respective array 720. For example Route R1 traverses nodes 120 of indices 6-5-16-17. Thus, array 720(1) indicates 5, 16, and 17 at entries of indices 6, 5, and 16, respectively. The remaining arrays 720(2), 720(3), . . . , corresponding to other routes are likewise marked.

An array 730 indicates route labels R1 to R10 and an array 740 contains updated costs of the individual routes and is initialized to respective values of the independent costs of routes R1 to R10 so that an entry j contains a current cost of route Rj, $1 \le j \le 10$.

With Route R1 selected as the preferred route of the generic route set to be transferred to the set of ranked routes, the level of intersection of each other remaining route of the generic route set with Route R1 can be determined using the route definitions of Table-I and array 720(1). A new cost of each remaining route may then be determined as the corresponding cost indicated in array 740 plus an increment equal to the intersection level times a cost-increment unit $\Delta$, $\Delta>0$. The value of $\Delta$ is a design parameter; $\Delta=8$ in the exemplary network of FIG. 1. Route R2 has the least initial cost (33 units) of the 9 remaining routes of the generic route set and has an intersection level of zero with Route R1. Thus, Route R2 is selected as the second best selected route as indicated in FIG. 7.

The modified cost of each of the remaining eight unselected routes of the generic route set is indicated in array 740(2) based on the level of intersection with the set of Route R1 and Route R2. Any cost modifications based on intersection with route R1 have already been determined. Thus, only intersection with route R2 need be considered. Route R3 has the least initial cost (34 units) of the eight remaining routes of the generic route set and has an intersection level of zero with the Route R2. Thus, Route R3 is selected as the third best route and added to the set of ranked routes.

The modified cost of each of the remaining seven unselected routes is indicated in array 740(3) based on the level of intersection with the currently selected routes (Route R1, Route R2, and Route R3). Route R4 has an initial cost of 38 units and route R5 has an initial cost of 39. However, Route R4 has a level of intersection of 3 with the selected routes while Route R5 has a level of intersection of 1 with the selected routes. Thus, the modified cost of Route R4 is 62 units while the modified cost of Route R5 is 47. Thus, route R5 is selected as the fourth route and added to the set of selected routes. The modified costs of Route R4 to Route R10 are {62, 47, 48, 57, 61, 54, and 58}.

The process continues as illustrated in FIG. 8 to select Route R9 as the fifth selected route and Route R6 as the sixth selected route. The above route-ranking process may be continued until all candidate routes of a route set are ranked. Alternatively, a smaller number of routes per route set may suffice. For example, the route set may retain only Route R1, Route R2, Route R3, Route R5, and Route R9 and the routes may be considered in that order for establishing connections from node 120(6) to node 120(17). The process applies to each other directed node pair.

Figure 9:
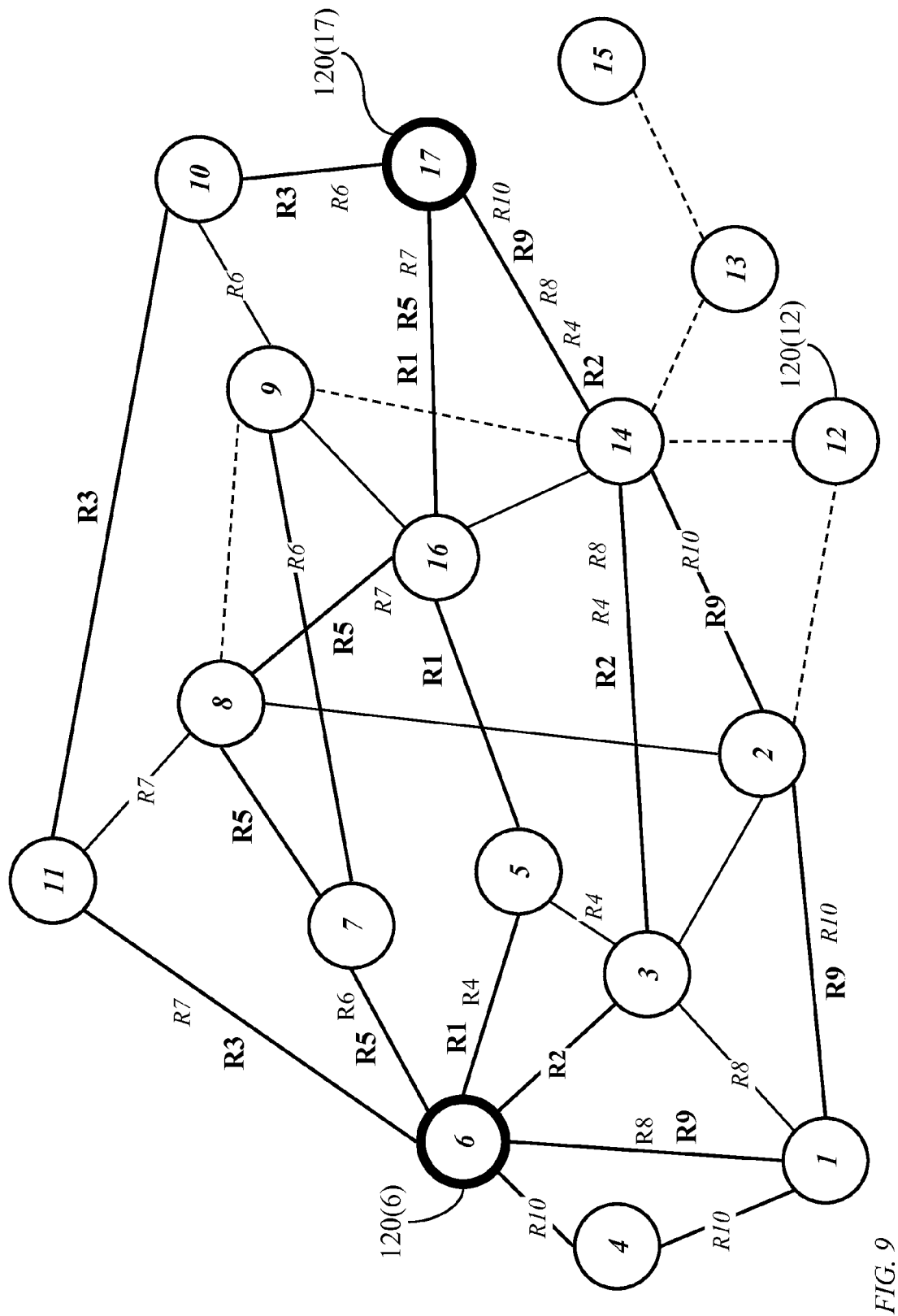
FIG. 9 illustrates the network of FIG. 1 indicating an exemplary generic route set.

FIG. 9 illustrates the network of FIG. 1 indicating the route set R1 to R10 defined in Table-I.

Figure 10:
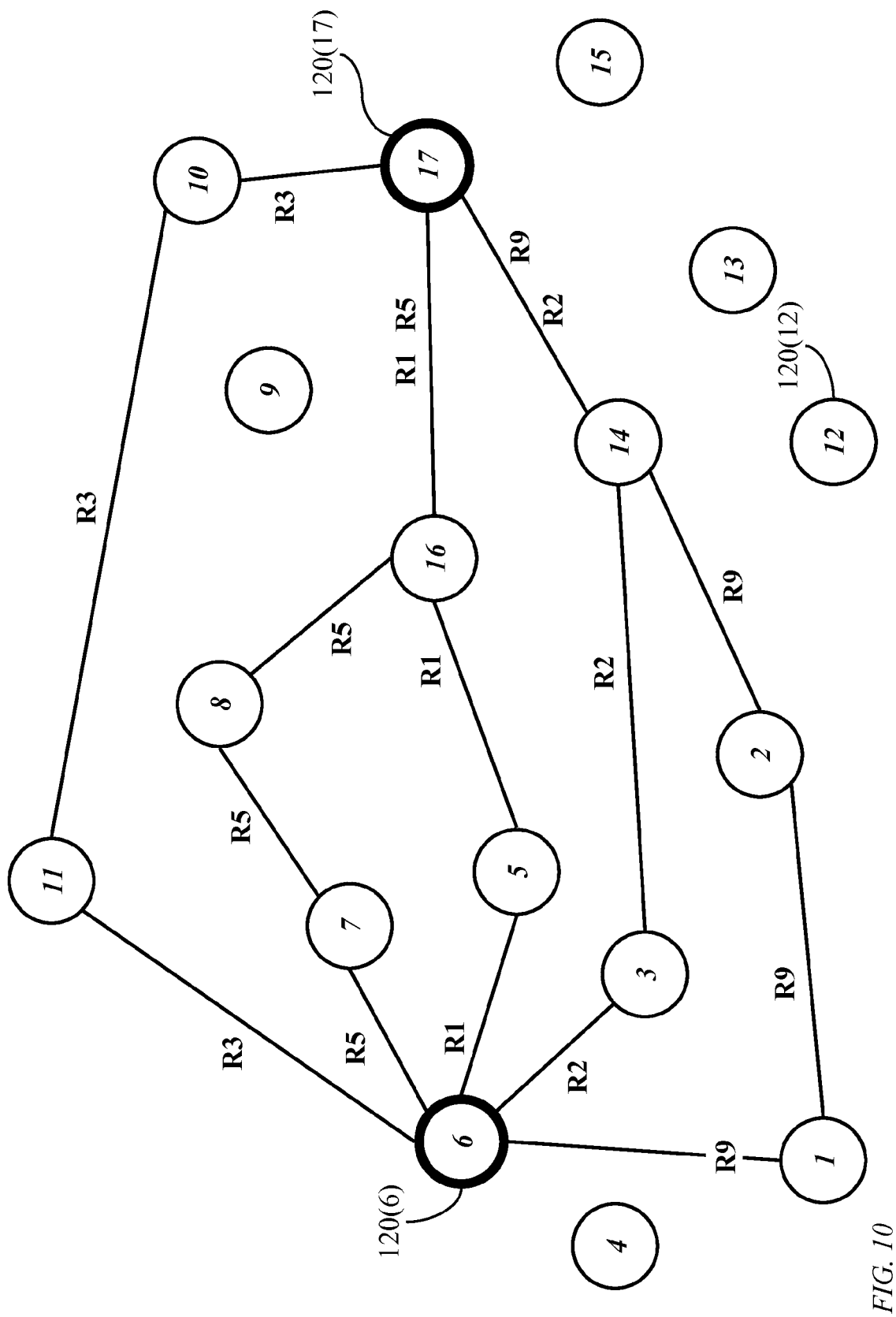
FIG. 10 illustrates the network of FIG. 1 indicating a subset of ranked routes of the generic route set of FIG. 9.

FIG. 10 illustrates the network of FIG. 1 indicating ranked routes R1, R2, R3, R5, and R9.

Inverse Routing Table

When a directional link changes state (for example, from the state "functional" to the state "failed" or vice versa), the end nodes of the directional link become aware of the state change. However, if the directional link is not the first link of a route, the originating node of the route need be notified of the unavailability of the route. Thus, it is useful to determine, for a directional link, the set of nodes originating routes traversing the directional link. Thus, if the directional link experiences a state change, the set of nodes can be notified to use alternate routes if needed. To realize this for each directional link in a network, an inversion of the overall routing table need be performed.

Network Partitioning

Figure 11:
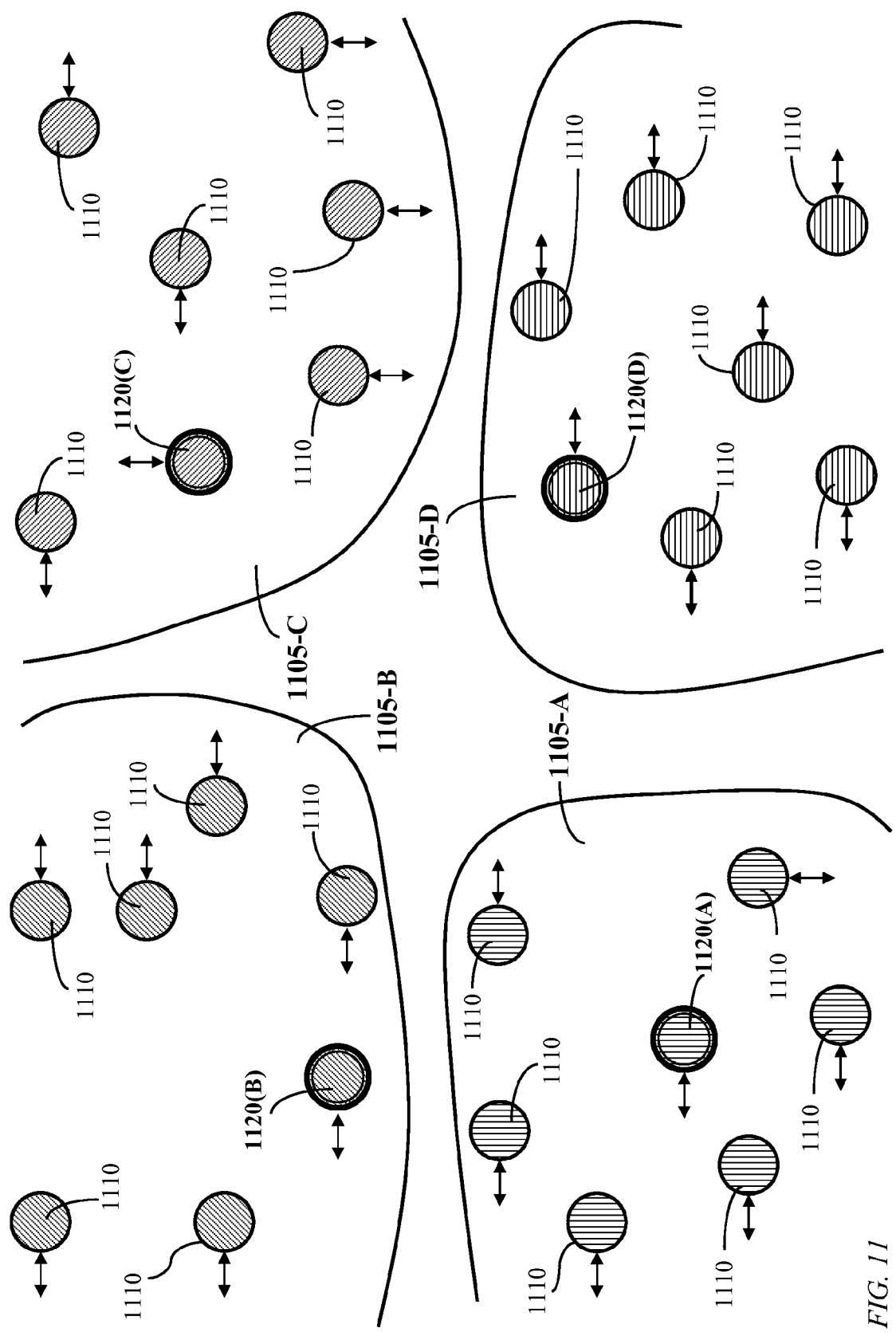
FIG. 11 illustrates a plurality of nodes partitioned into nodal domains based on geographic proximity where each nodal domain comprises a respective set of ordinary nodes and a principal node hosting a respective network controller.
Figure 13:
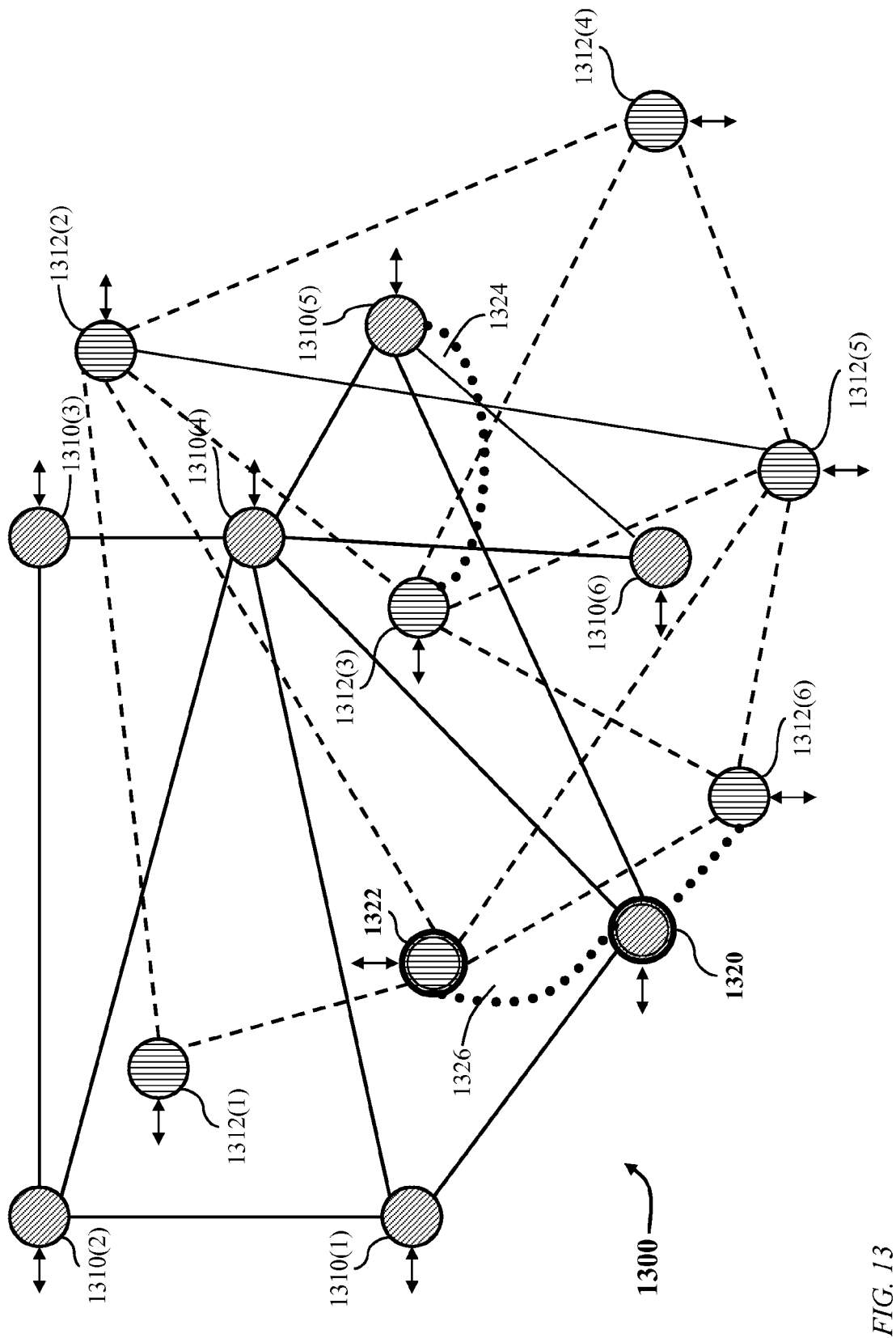
FIG. 13 illustrates two nodal domains defined according to considerations other than geographic proximity.

FIG. 11 illustrates a plurality of nodes of a large-scale network arranged into four network domains 1105, individually identified as network domains 1105-A, 1105-B, 1105-C, and 1105-D. The network domains may be defined according to geographic proximity of nodes or according to other administrative considerations (FIG. 13). A principal node 1120 in each network domain hosts a domain controller, also called network controller, as described below with reference to FIG. 18. The remaining nodes 1110 of a network domain are ordinary nodes each having a respective node controller as described below with reference to FIG. 17.

Figure 12:
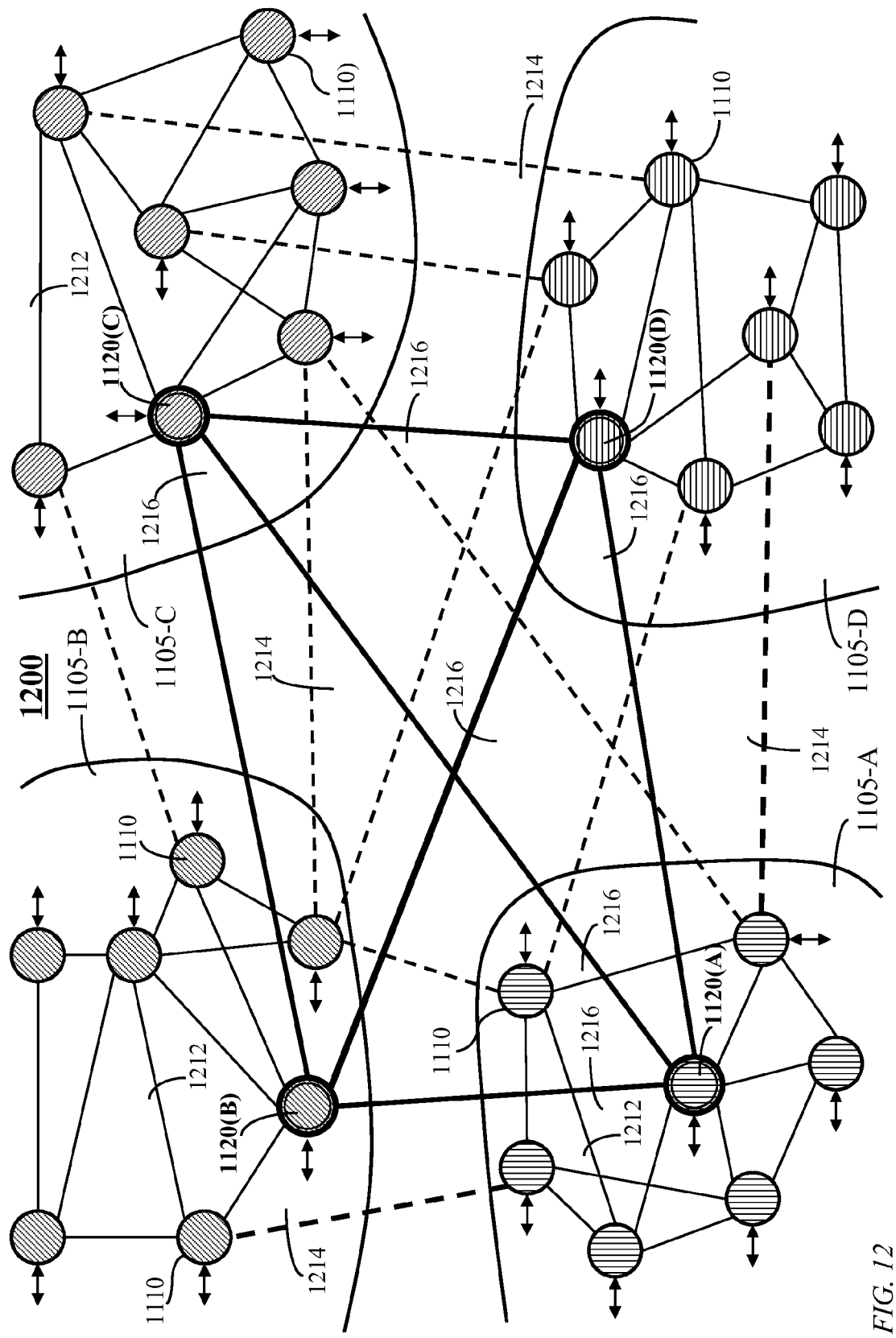
FIG. 12 illustrates interconnection of the plurality of nodes illustrated in FIG. 11, where principal nodes of the nodal domains are interconnected in a full-mesh structure, in accordance with an embodiment of the present invention.

FIG. 12 illustrates a network 1200 comprising the plurality of nodes of FIG. 11. The ordinary nodes 1110 and the principal node 1120 of each network domain 1105 are partially or fully interconnected through links 1212. Inter-nodal links 1214 connect selected nodes of each network domain 1105 to selected nodes of other network domain. The principal nodes of the domains 1105 may be interconnected in a full-mesh structure through dual links 1216.

FIG. 13 illustrates two nodal domains, defined according to considerations other than geographic proximity of nodes. The two nodal domains may cover overlapping geographic areas. One of the two nodal domains comprises a principal node 1320 and ordinary nodes 1310, individually identified as nodes 1310(1) to 1310(6). The other nodal domain comprises a principal node 1322 and ordinary nodes 1312, individually identified as nodes 1312(1) to 1312(6). Ordinary nodes of the two nodal domains may be directly connected; for example a dual link 1324 connects nodes 1310(5) and 1312(3). The principal nodes of the two nodal domains may be directly connected (dual link 1326). The principal nodes of nodal domains in a network partitioned into multiple network domains may be interconnected through an inter-domain cross connector.

Figure 14:
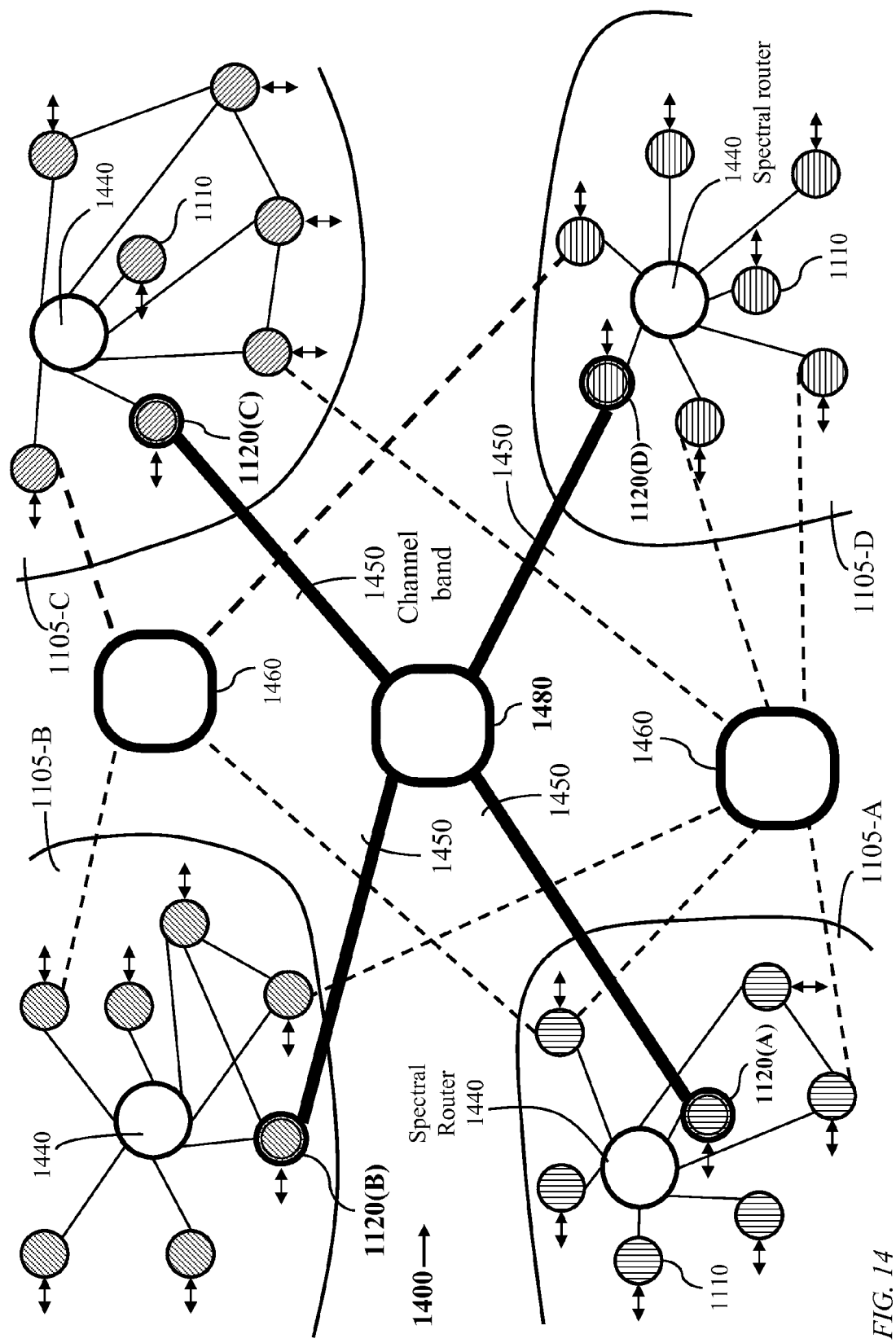
FIG. 14 illustrates a cross connector interconnecting principal nodes and cross connectors interconnecting ordinary nodes of the nodal domains of FIG. 11, in accordance with an embodiment of the present invention.

FIG. 14 illustrates a network 1400 similar to network 1200. The main difference between network 1400 and network 1200 is that, where the number of principal nodes exceeds two, an inter-domain cross connector 1480 interconnects the principal nodes 1120 of the network domains 1105. Cross connectors 1460 may interconnect ordinary nodes 1110 of the domains 1105, where each cross connector 1460 interconnects at least three ordinary nodes. Additionally, a spectral router 1440 may be used to interconnect ordinary nodes and a principal node within a network domain 1105.

Figure 21:
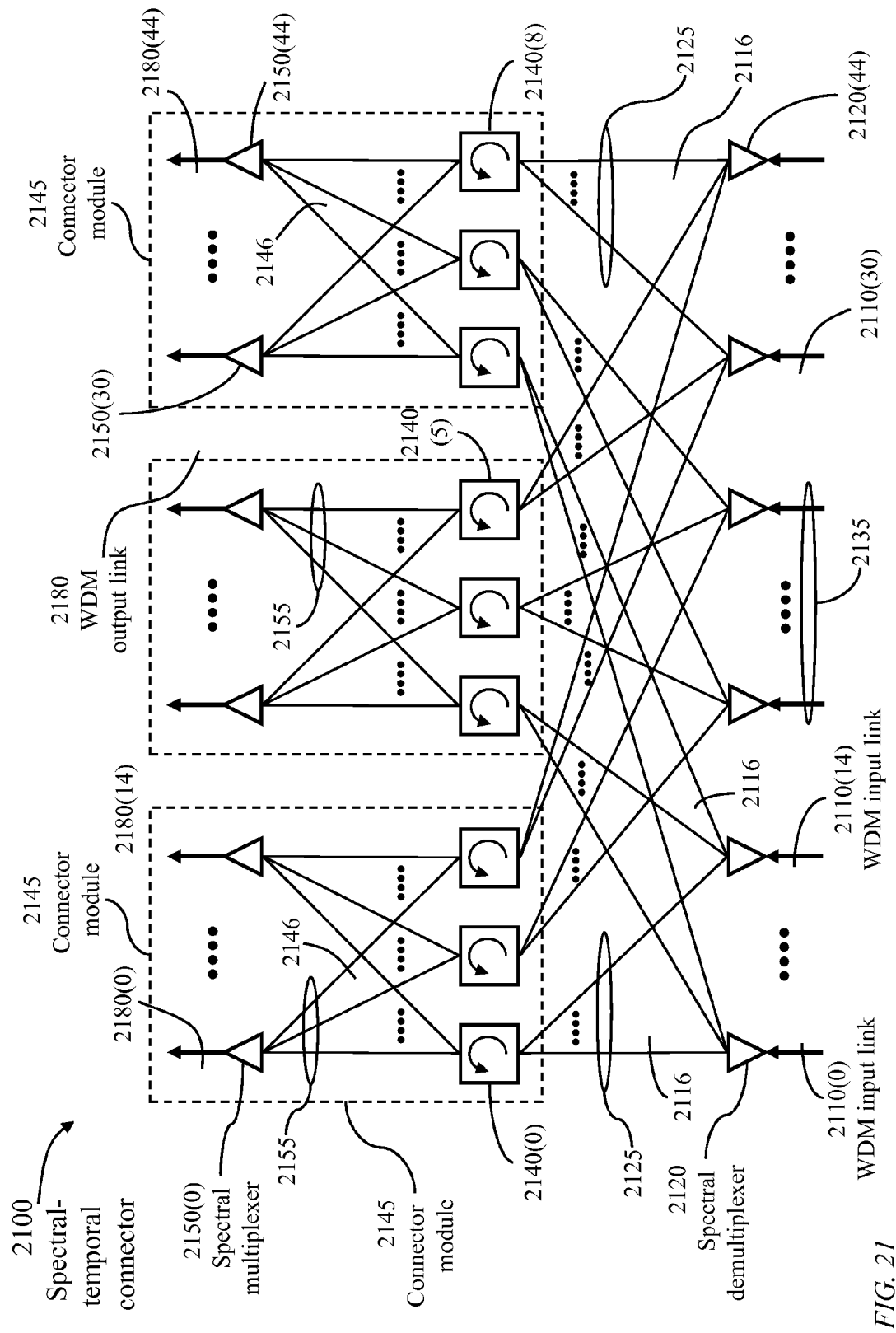
FIG. 21 illustrates a spectral-temporal connector employing an array of temporal rotators for transferring signals from each wavelength-division-multiplexed (WDM) input link of a plurality of WDM input links to each WDM output link of a plurality of WDM output links.
Figure 29:
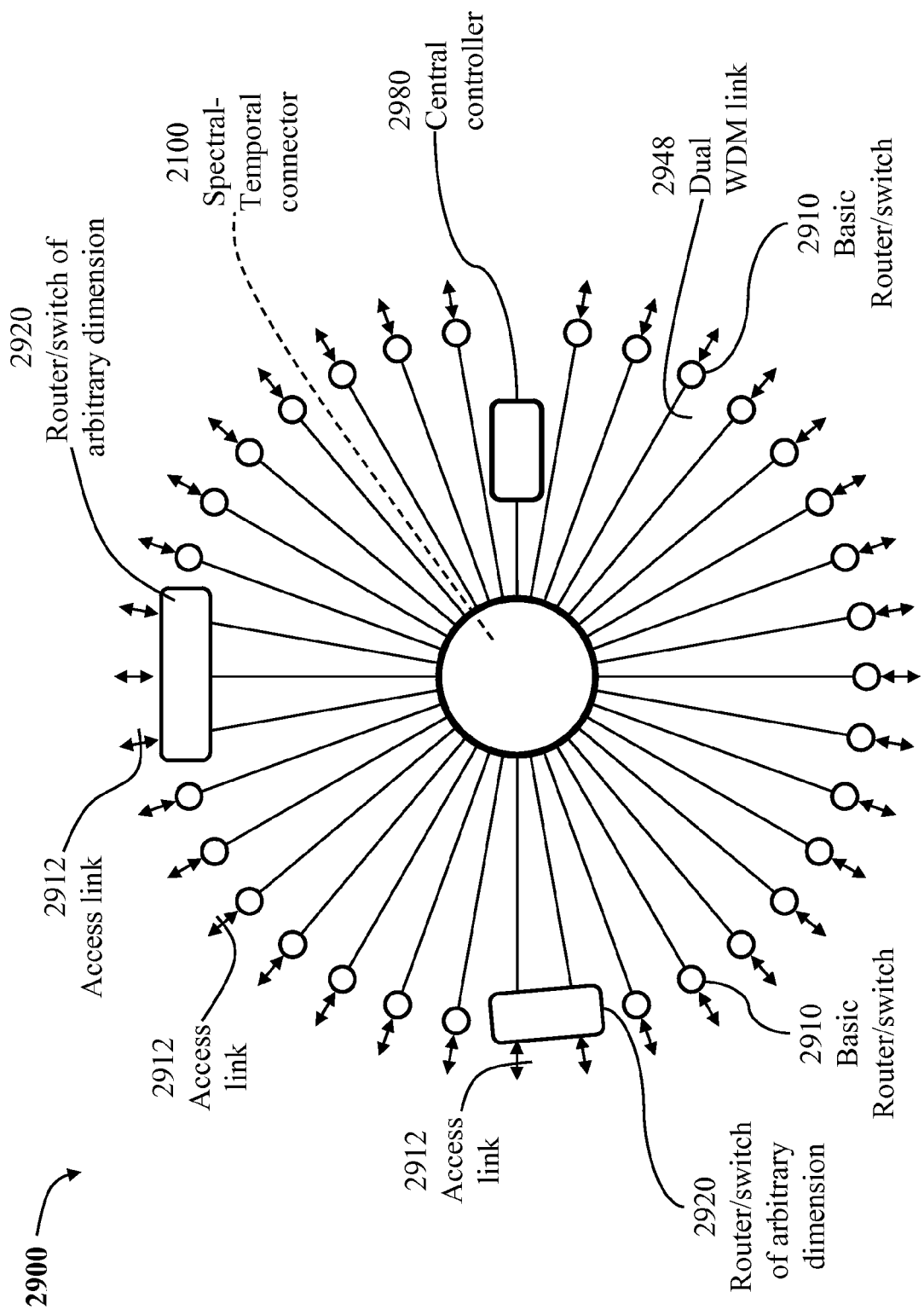
FIG. 29 illustrates a control network comprising a spectral-temporal connector supporting a central controller and providing a dual path from the central controller to each node connecting to the spectral-temporal connector as well as a path from each node to each other node.

The inter-domain cross connector 1480 may be implemented as a spectral router where each WDM link 1450 from a principal node 1120 carries a spectral band (a wavelength band) directed to each other principal node 1120. However, the rate of control data exchanged among the network domains may not be high enough to justify forming a full spectral mesh. In an exemplary global network partitioned into 64 network domains, for example, a WDM link 1450 would carry 63 spectral bands directed to 63 principal nodes 1120 through the inter-domain cross connector 1480. A spectral router providing narrow spectral bands may be used. Otherwise, it may be more efficient to implement cross connector 1480 as a temporal rotator instead of a spectral router. To interconnect a large number of principal nodes (or network controllers coupled to the principal nodes), it may be preferable to use a spectral-temporal connector as illustrated in FIG. 21 and FIG. 29.

Figure 15:
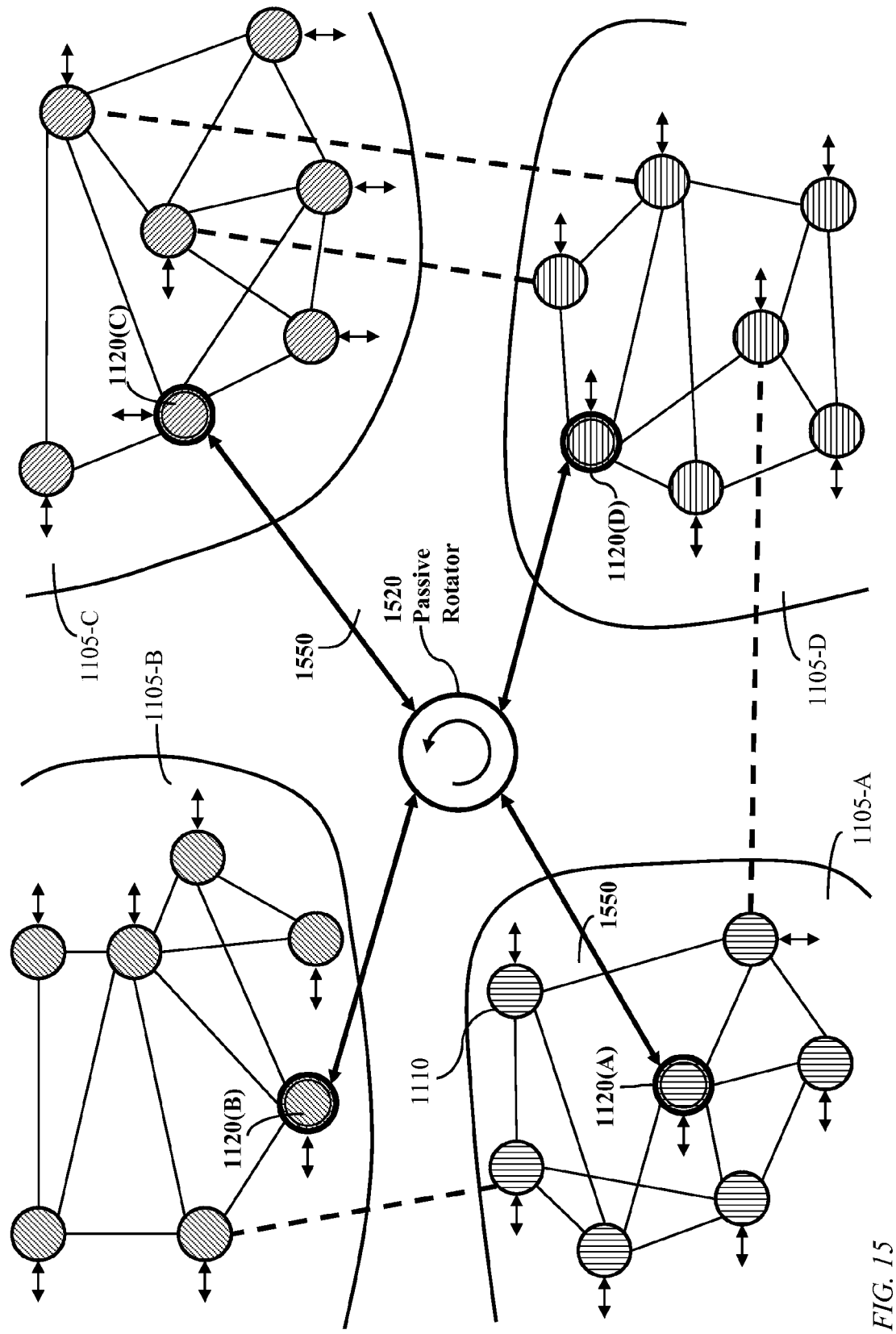
FIG. 15 illustrates a cyclical cross connector implemented as a passive spectral-temporal connector interconnecting principal nodes of the nodal domains of FIG. 11, in accordance with an embodiment of the present invention.

FIG. 15 illustrates a passive temporal rotator 1520 interconnecting principal nodes 1120 of the nodal domains of FIG. 11. Each principal node 1120 has a path, during a respective time slot of a rotation cycle, to each other principal node through temporal rotator 1520. In an exemplary global network partitioned into 64 network domains, a single channel 1550 of a capacity of 10 Gigabits per second, for example, may carry control data to each principal node 1120 at a rate exceeding 150 Megabits per second.

Figure 16:
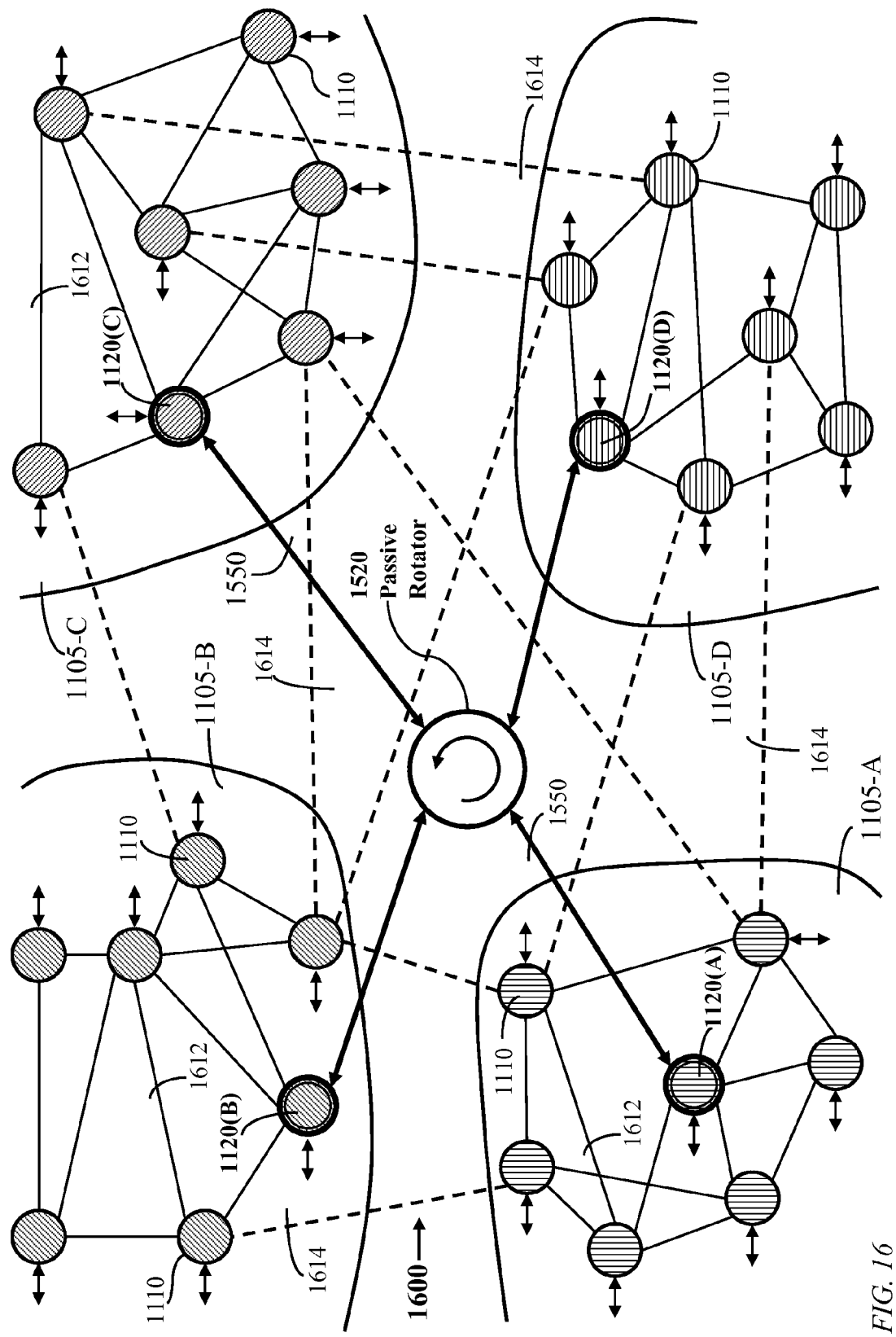
FIG. 16 illustrates principal nodes of individual network domains interconnected through a passive spectral-temporal connector while a plurality of links connect selected node pairs, in accordance with an embodiment of the present invention.

FIG. 16 illustrates a network 1600 similar to network 1200 comprising the plurality of nodes of FIG. 11 where a passive temporal rotator 1520 interconnects principal nodes 1120 of the domains of FIG. 11. Each principal node 1120 has a respective dual channel 1550 to the temporal rotator 1520. The temporal rotator 1520 provides a path to each other principal node through temporal rotator 1520 during a respective time slot of a rotation cycle. As in network 1200, the ordinary nodes 1110 and the principal node 1120 of each network domain 1105 are partially or fully interconnected through links 1612. Inter-nodal links 1614 connect selected nodes of a network domain 1105 to selected nodes of other network domains.

Switching Node

Figure 17:
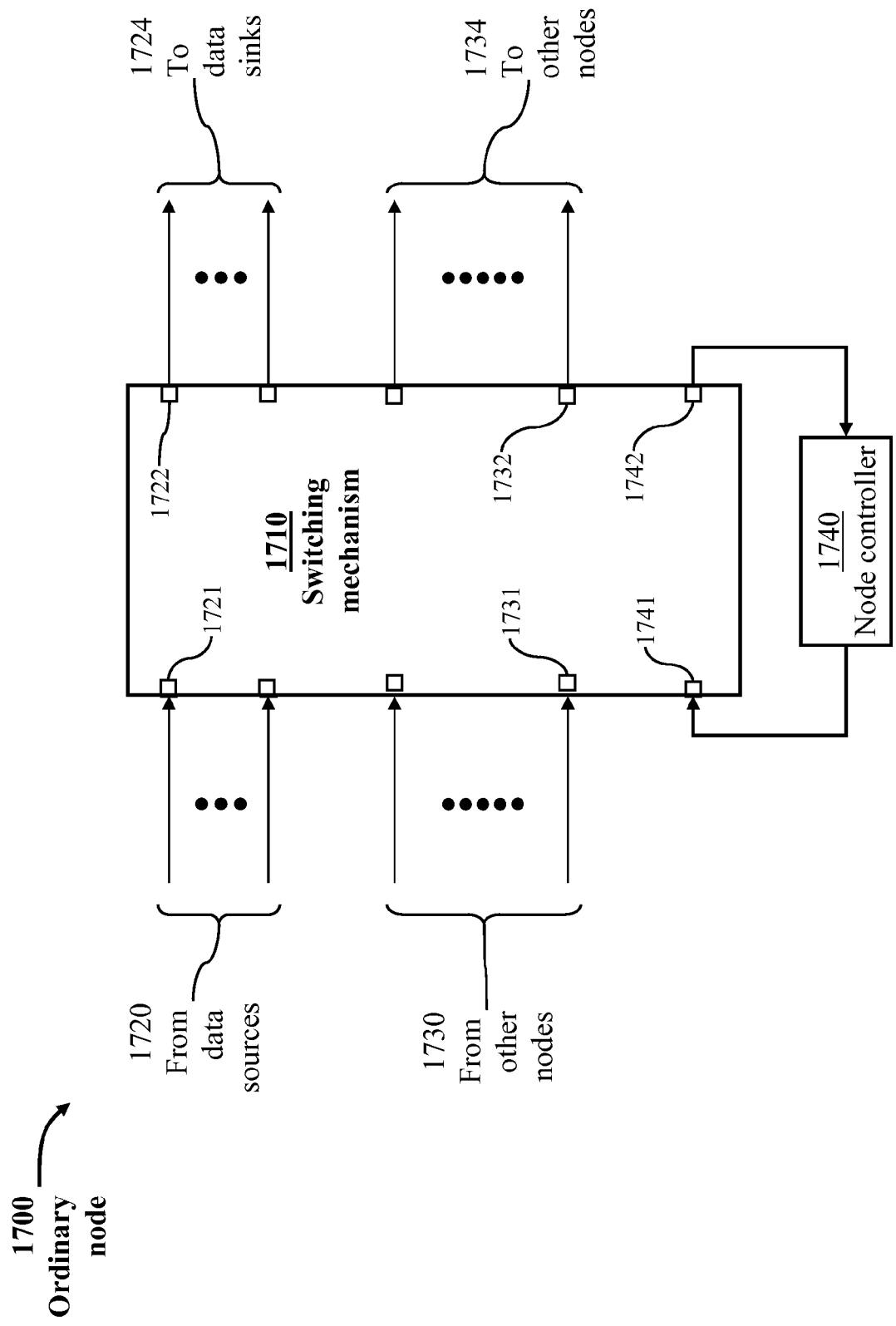
FIG. 17 illustrates an ordinary node, of the plurality of nodes of FIG. 11, having a respective node controller.

FIG. 17 illustrates a switching node 1700 which may serve as an ordinary node 1110 of any of networks 1200, 1400, or 1600. Switching node 1700 comprises a switching mechanism (a "switch fabric") 1710 coupled to a node controller 1740. The switching mechanism has input ports including a control input port 1741 receiving control data from node controller 1740, a first group of input ports 1721 receiving data from data sources through channels 1720 and a second group of input ports 1731 receiving data from other switching nodes 1110 or 1120 through channels 1730. The switching mechanism has output ports including a control output port 1742 transmitting control data to node controller 1740, a first group of output ports 1722 transmitting data to data sinks through channels 1724 and a second group of output ports 1732 transmitting data to other switching nodes 1110 or 1120 through channels 1734. Each input port 1721 or 1731 transmits control data to node controller 1740 through the switching mechanism 1710 during a respective dedicated time slot of a predefined slotted time frame. Node controller 1740 transmits control data to output ports 1722 and 1732 through the switching mechanism 1710 where each output port receives control data during a respective time slot of the predefined time frame.

The node controller 1740 of the switching node 1700 of FIG. 17 is accessed through the switching mechanism 1710. Alternatively, a node controller may be accessed through a bus (not illustrated) connecting the ports {1721, 1722, 1731, 1732} of the switching node to the node controller.

Figure 18:
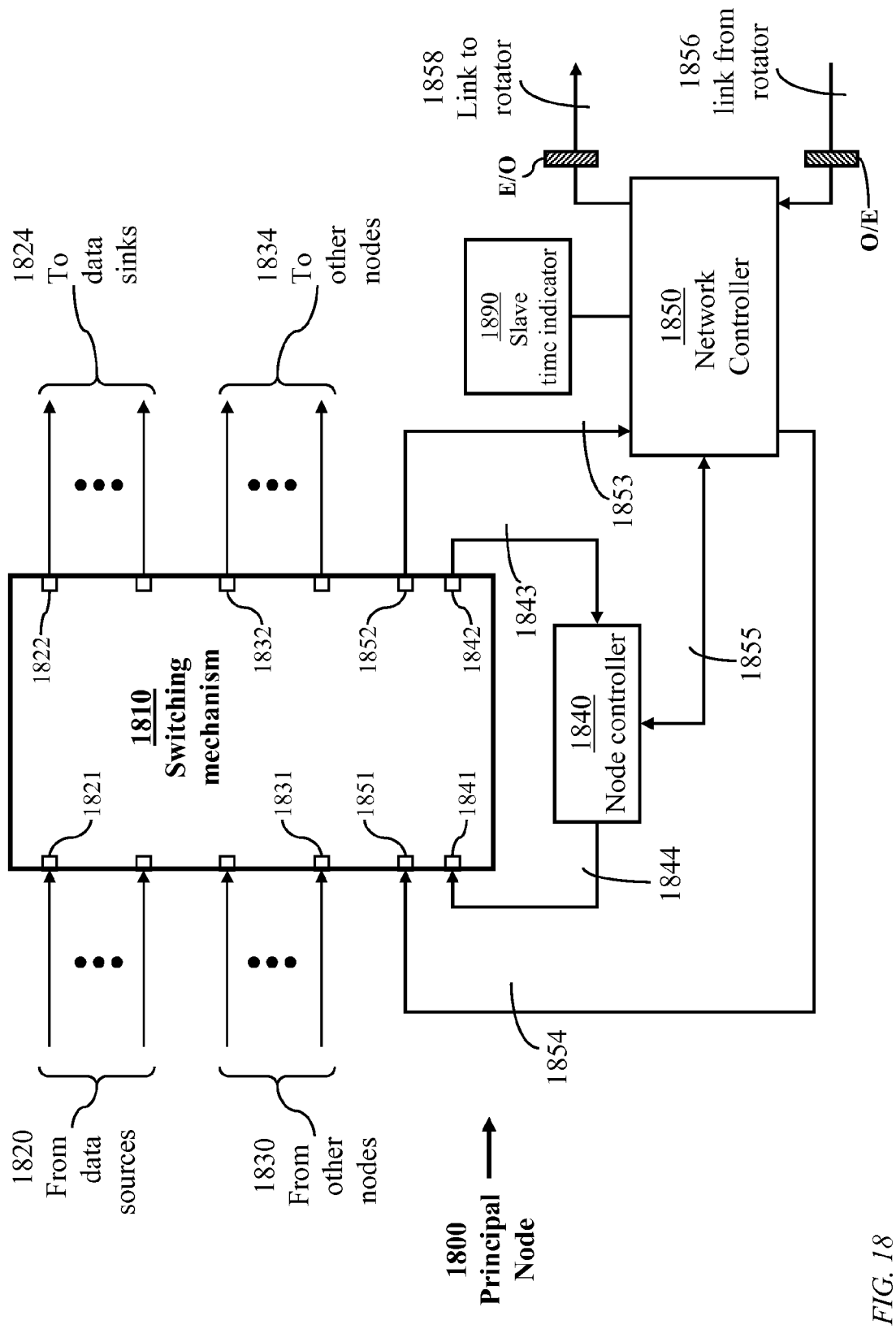
FIG. 18 illustrates a principal node, of the plurality of nodes of FIG. 11, having a respective node controller and a network controller, in accordance with an embodiment of the present invention.

FIG. 18 illustrates a switching node 1800 which may serve as a principal node 1120 of any of networks 1200, 1400, or 1600. Switching node 1800 comprises a switching mechanism 1810 coupled to a node controller 1840, through channels 1843, and 1844, and a network controller 1850 through channels 1853 and 1854. The switching mechanism has input ports including a control input port 1841 receiving control data from node controller 1840, a control input port 1851 receiving control data from network controller 1850, a first group of input ports 1821 receiving data from data sources through channels 1820 and a second group of input ports 1831 receiving data from other switching nodes 1110 or 1120 through channels 1830. The switching mechanism 1810 has output ports including a control output port 1842 for transmitting control data to node controller 1840, a control output port 1852 for transmitting control data to network controller 1850, a first group of output ports 1822 for transmitting data to data sinks through channels 1824, and a second group of output ports 1832 transmitting data to other switching nodes 1110 or 1120 through channels 1834. Each input port 1821 or 1831 transmits control data to node controller 1840 and network controller 1850 through the switching mechanism 1810 during respective dedicated time slots of a predefined slotted time frame. Node controller 1840 transmits control data to output ports 1822 and 1832 through the switching mechanism 1810 during respective time slots of the predefined time frame. Likewise, network controller 1850 transmits control data to output ports 1822 and 1832 through the switching mechanism 1810 during respective time slots of the predefined time frame. The node controller 1840 and network controller 1850 may exchange control data through a dual link 1855. The network controller 1850 connects to an optical link 1856 from a cross connector through an optical-to-electrical (O/E) converter. The network controller 1850 connects to an optical link 1858 to the cross connector through an electrical-to-optical (E/O) converter.

A network controller 1850 may connect to a dual port {1851-1852} of a switching mechanism 1810 of a respective principal node 1800 for receiving characterizing information of respective links. Alternatively, a network controller 1850 may connect to a dual port of a nodal controller 1840 of a respective principal node for receiving, through said nodal controller, characterizing information of respective links.

Figure 19:
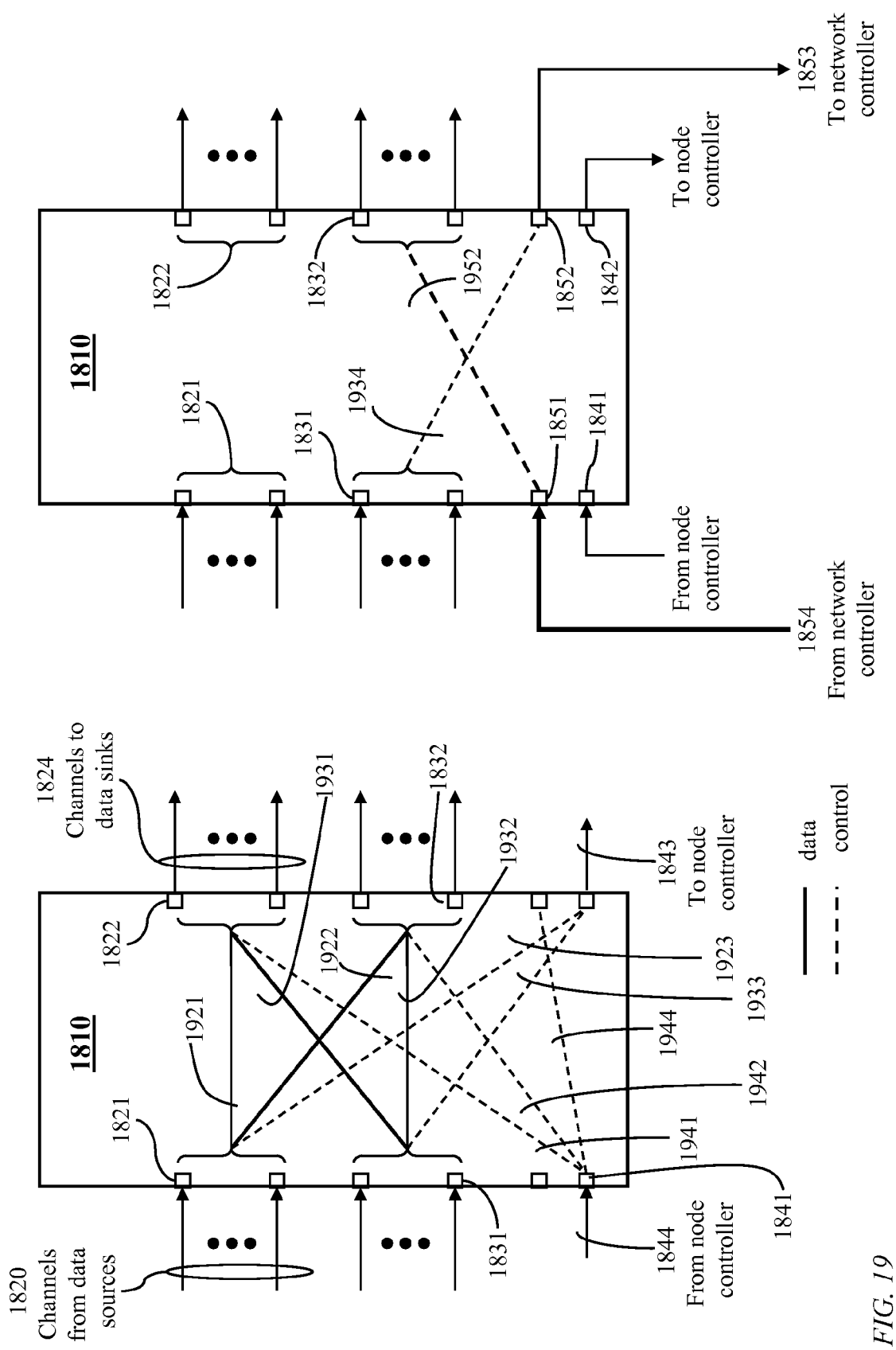
FIG. 19 illustrates data paths and control paths within the principal node of FIG. 18, in accordance with an embodiment of the present invention.

FIG. 19 illustrates internal switched paths within the switching mechanism 1810 of switching node 1800. An input port 1821 has a path 1923 to node controller 1840 during a respective dedicated time slot. An input port 1821 may have a switched path 1921 to an output port 1822 and a switched path 1922 to an output port 1832. An input port 1831 has a path 1933 to node controller 1840, during a respective dedicated time slot, and a path 1934 to network controller 1850 during a respective dedicated time slot. An input port 1831 may have a switched path 1931 to an output port 1822 and a switched path 1932 to an output port 1832. An input port 1841 connecting to node controller 1840 may have a switched path 1941 to an output port 1822, a switched path 1942 to an output port 1832, and a switched path 1944 to output port 1852 connecting to network controller 1850. An input port 1851 connecting to network controller 1850 may have a switched path 1952 to an output port 1832.

Figure 20:
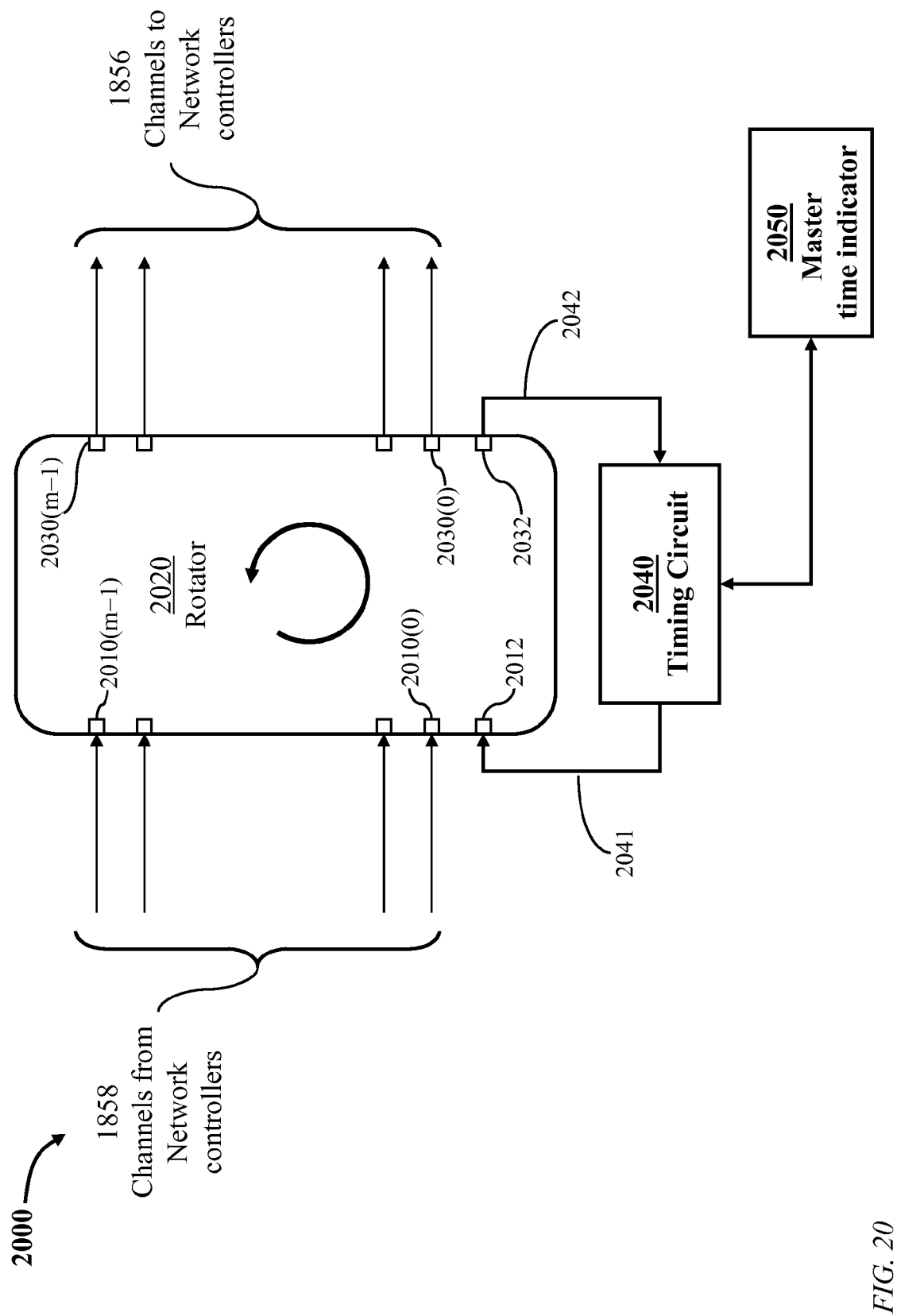
FIG. 20 illustrates a cross connector comprising a temporal rotator coupled to a master time indicator for interconnecting network controllers or principal nodes, in accordance with an embodiment of the present invention.

FIG. 20 illustrates a cross connector 2000 comprising a temporal rotator 2020 having a number of input ports 2010, individually identified as input ports 2010(0) to 2010(m−1), and a number of output ports 2030 individually identified as output ports 2030(0) to 2030(m−1), where m is a number of principal nodes 1120, of the type of switching node 1800, connecting to the rotator, m>2. A timing circuit 2040 connects to a control input port 2012 through a channel 2041 and a control output port 2032 through a channel 2042. Each of m principal nodes 1120 connects to a respective input port 2010 and a respective output port 2030. A master time indicator 2050 is coupled to the timing circuit 2040. The illustrated connectivity of the timing circuit and the network controllers to the rotator 2020 is arbitrary; the timing circuit 2040 may connect to any input port and any output port of temporal rotator 2020, and a principal node 1120 may connect to any input port 2010 and any output port 2030.

Figure 26:
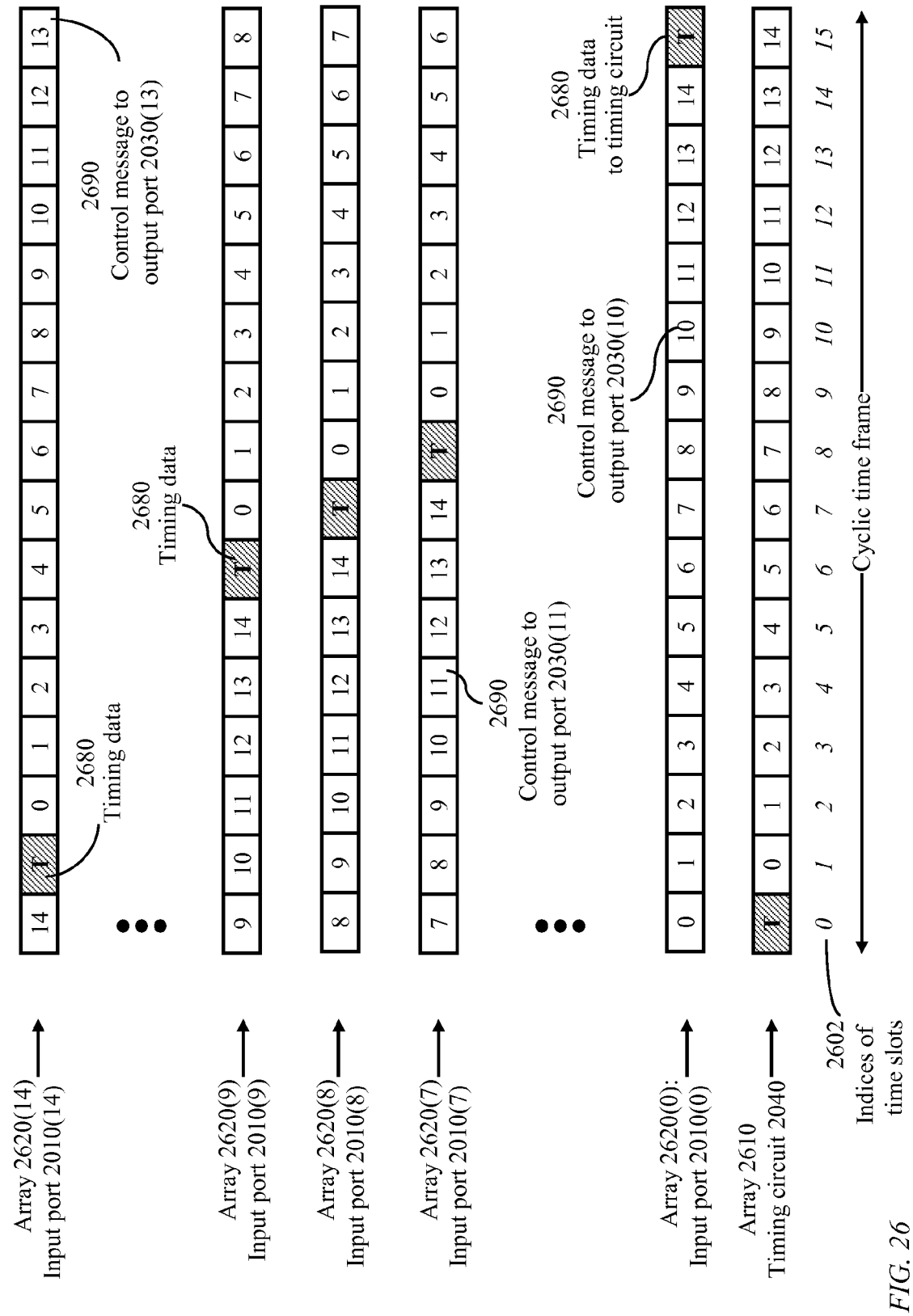
FIG. 26 illustrates timing of control messages from network controllers, in accordance with an embodiment of the present invention.
Figure 27:
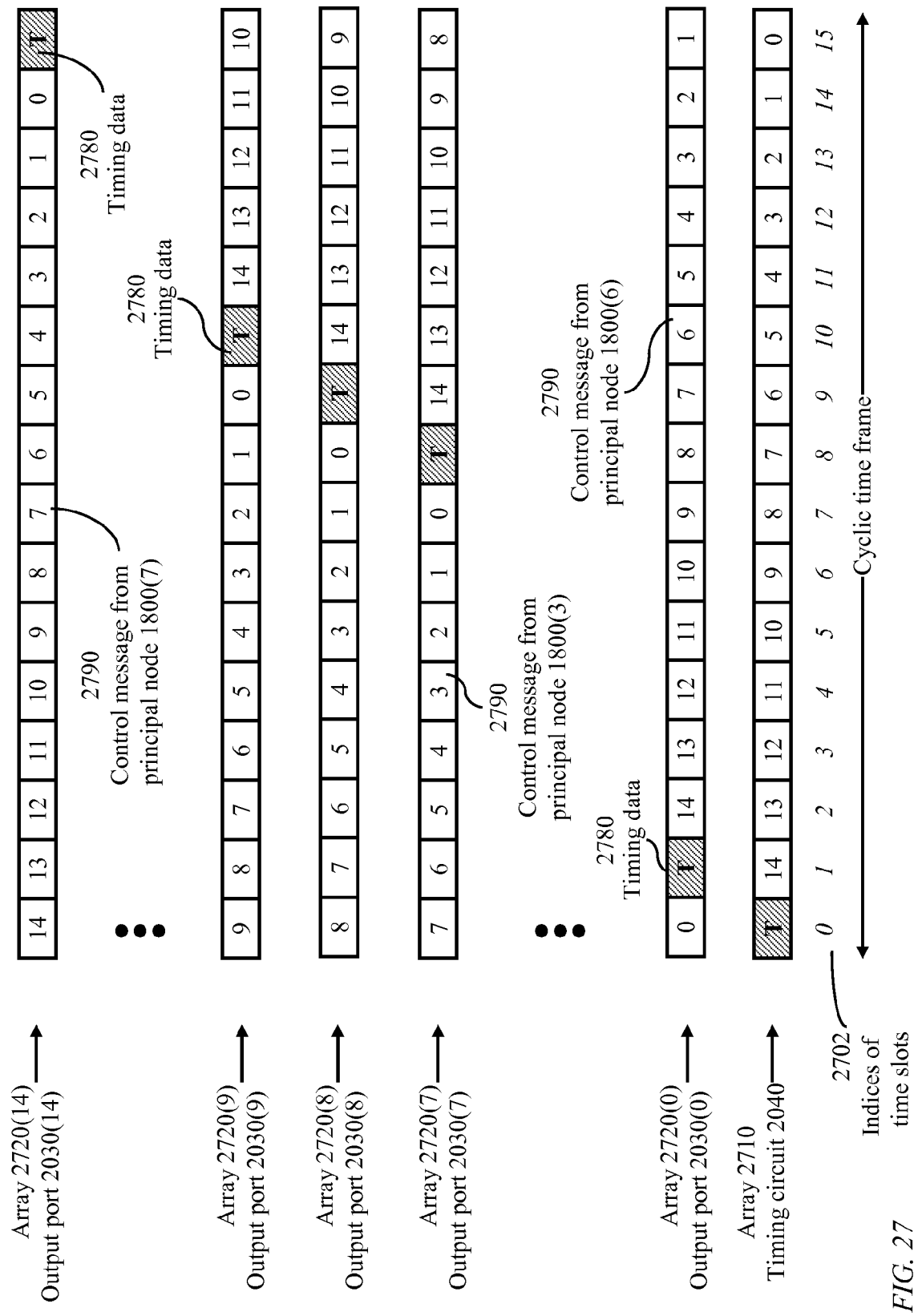
FIG. 27 illustrates timing of control messages to network controllers, in accordance with an embodiment of the present invention.

As illustrated in FIG. 26 and FIG. 27, each input port 2010 connects to the timing circuit through the rotator during a respective time slot of a time frame and the timing circuit 2040 connects through the rotator to each output port 2030 during a respective time slot of the time frame. The timing circuit receives an indication $t_1$ of a time instant at which a data segment is transmitted from a specific network controller and returns a discrepancy between a corresponding time instant $t_2$ at which the data segment is received at the rotator and the transmission time instant $t_1$. The time instant $t_2$ is determined as a reading of the master time indicator 2050 coincident with the reception time of the data segment. The discrepancy $(t_2-t_1)$ is the sum of propagation delay along a path from the specific network controller to the rotator 2020 and the offset of the master time indicator 2050 with respect to a time indicator of the network controller. The exchange of timing data between the timing circuit 2040 and the network controllers enables maintaining alignment of data segments received at the input ports 2010. Initially, or at one point in time, it is plausible that an input port 2010 be not aligned with the master time indicator 2050, in which case the network controller connecting to the input port 2010 may continually send data segments with respective timing data so that the timing circuit 2040 can capture one of the data segments and report timing discrepancy to the network controller; the network controller may then reset its time reference. To ensure alignment of data received at the input ports 2010(0) to 2010(m−1), all network controllers connecting to the rotator 2020 may reset their respective time indicators to a same reference value so that a sum of propagation delay and time-indicator offset is the same for all network controllers. A preferred reference value is the reference time of the master time indicator 2050. Thus, the specific network controller may ensure that $t_1$ equals $t_2$ by resetting its time indicator according to any discrepancy $(t_2-t_1)$.

The rotator 2020 may be photonic so that data can be exchanged with network controllers 1850 without the need for optical-electrical converters and electrical-optical converters. However, the rotator may be implemented as an electronic device and—with the time-alignment mechanism described above—no buffers would be needed at the input ports 2010.

FIG. 21 illustrates a spectral-temporal connector 2100, disclosed in U.S. patent application Ser. No. 14/741,475, which connects each wavelength-division-multiplexed (WDM) input link 2110 of a plurality of WDM input links to each WDM output link 2180 of a plurality of WDM output links. The spectral-temporal connector 2100 employs an array of temporal rotators 2140, each temporal rotator 2140 having m input ports 2010 each connecting to a channel from a WDM input link 2110 and m output ports 2030 each connecting to a channel of a WDM output link 2180, m>2. The spectral-temporal connector is described in detail in U.S. patent application Ser. No. 14/741,475, the specification of which is incorporated herein by reference. Each WDM input link 2110 carries input signals occupying Λ spectral bands, and each WDM output link 2180 carries signals occupying Λ spectral bands Λ>1. In accordance to an embodiment, each temporal rotator 2140 is implemented as a fast optical rotator 2020 where the input-output connectivity shifts during successive short time interval (of the order of 10 nanoseconds, for example). An array of $\Lambda^2$ temporal optical rotators 2020 (FIG. 20) and an array of Λ×m spectral multiplexers 2150 are arranged into Λ connector modules 2145, each connector module having Λ temporal rotators and m spectral multiplexers. Each input link 2110 carries optical signals occupying multiple spectral bands. Each of spectral demultiplexers 2120 directs individual signals, each occupying one of Λ spectral bands, of a respective WDM input link 2110 to rotators 2020 of different connector modules 2145. The input links 2110 are arranged into input-link groups 2135. A set 2125 of input channels 2116 comprising one channel from each input link 2110 of an input-link group 2135 connects to one temporal rotator 2140 of a connector module 2145. A set 2155 of output channels 2146 comprising one output channel 2146 from each temporal rotator 2140 of a connector module 2145 connects to one spectral multiplexer 2150.

Each rotator 2020 is coupled to a respective timing circuit 2040 as in the configuration of FIG. 20 and a master time indicator similar to master time indicator 2050 (not illustrated in FIG. 21) provides a reference time to all of the timing circuits 2040 of rotators 2020. In order to facilitate temporal alignment of signals received at a temporal rotator 2020, each temporal rotator may dedicate a dual port for communicating timing signals. Thus, a temporal rotator 2020 may have m data input ports and m data output ports, and at least one control input port receiving timing data from a respective timing circuit 2040 and at least one control output port transmitting timing data to the respective timing circuit 2040.

Figure 22:
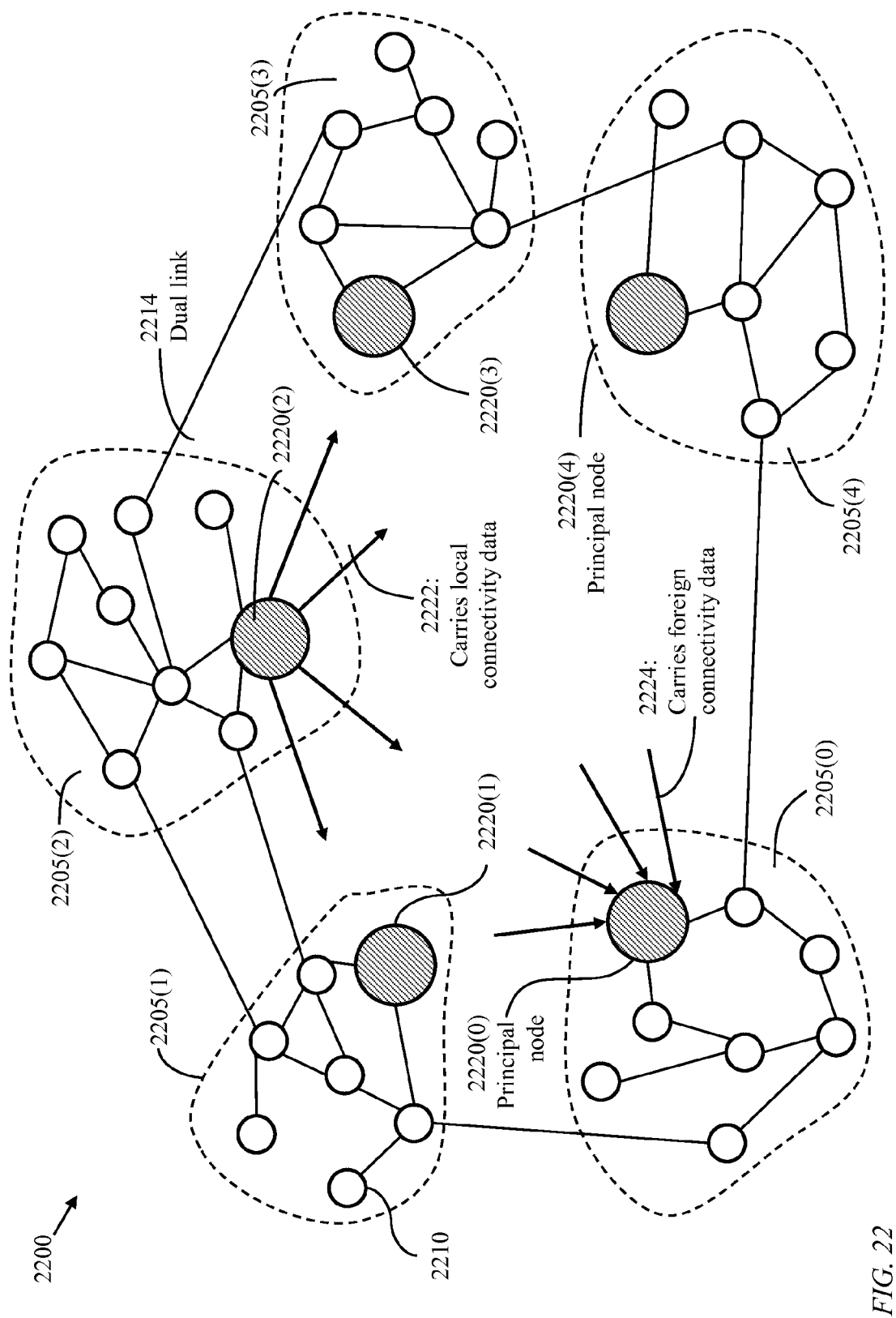
FIG. 22 illustrates a number of network domains, each network domain having at least one node (a router, packet switch) supporting a respective network controller, the network controllers of the network domains being interconnected in a full mesh, in accordance with an embodiment of the present invention.

FIG. 22 illustrates a network 2200 having nodes partitioned into five groups, each group forming a network domain 2205. The network domains are individually identified as 2205(0), 2205(1), 2205(2), 2205(3), and 2205(4). Each network domain 2205 has a principal node 2220 and a number of ordinary nodes 2210. Each principal node hosts a respective network controller. Ordinary nodes 2210 of different domains may be interconnected through links 2214. The principal nodes of the five network domains may exchange connectivity data and link-state data. The principal nodes 2220 are individually identified as 2220(0), 2220(1), 2220(2), 2220(3), and 2220(4). A principal node 2220 of a network domain communicates local connectivity data of nodes within the network domain and, reciprocally, receives connectivity data of other network domains. Principal node 2220(2), for example, sends connectivity data of nodes within network domain 2205(2) to other principal nodes through a set of links 2222. Principal node 2220(0) receives foreign connectivity data of other network domains through a set of links 2224. The principal nodes 2220 may exchange link-state data either selectively or through multicasting.

As in the network configuration of FIG. 12, the principal nodes 2220 may be interconnected in a mesh structure, where each principal node 2220 has a link to each other principal node 2220 for exchanging control information.

As in the network configuration of FIG. 14, the principal nodes 2220 may be interconnected through an inter-domain cross connector. The cross connector may be implemented as a spectral router having a WDM link to and from each principal node 2220. Each WDM link from a principal node 2220 carries a spectral band (a wavelength band) directed to each other principal node 2220.

Each ordinary node 2210 has a node controller as illustrated in FIG. 17. A node controller coupled to a particular ordinary node is configured to determine an operating state of each link emanating from the particular ordinary node or each link terminating on the particular ordinary node. A node controller reports a change of the operating state to a respective network controller communicatively coupled to the particular ordinary node.

Although FIG. 22 illustrates a network organized into only five network domains, it should be understood that the methods of the present application applies to large scale networks which may be organized in several thousand domains.

Figure 23:
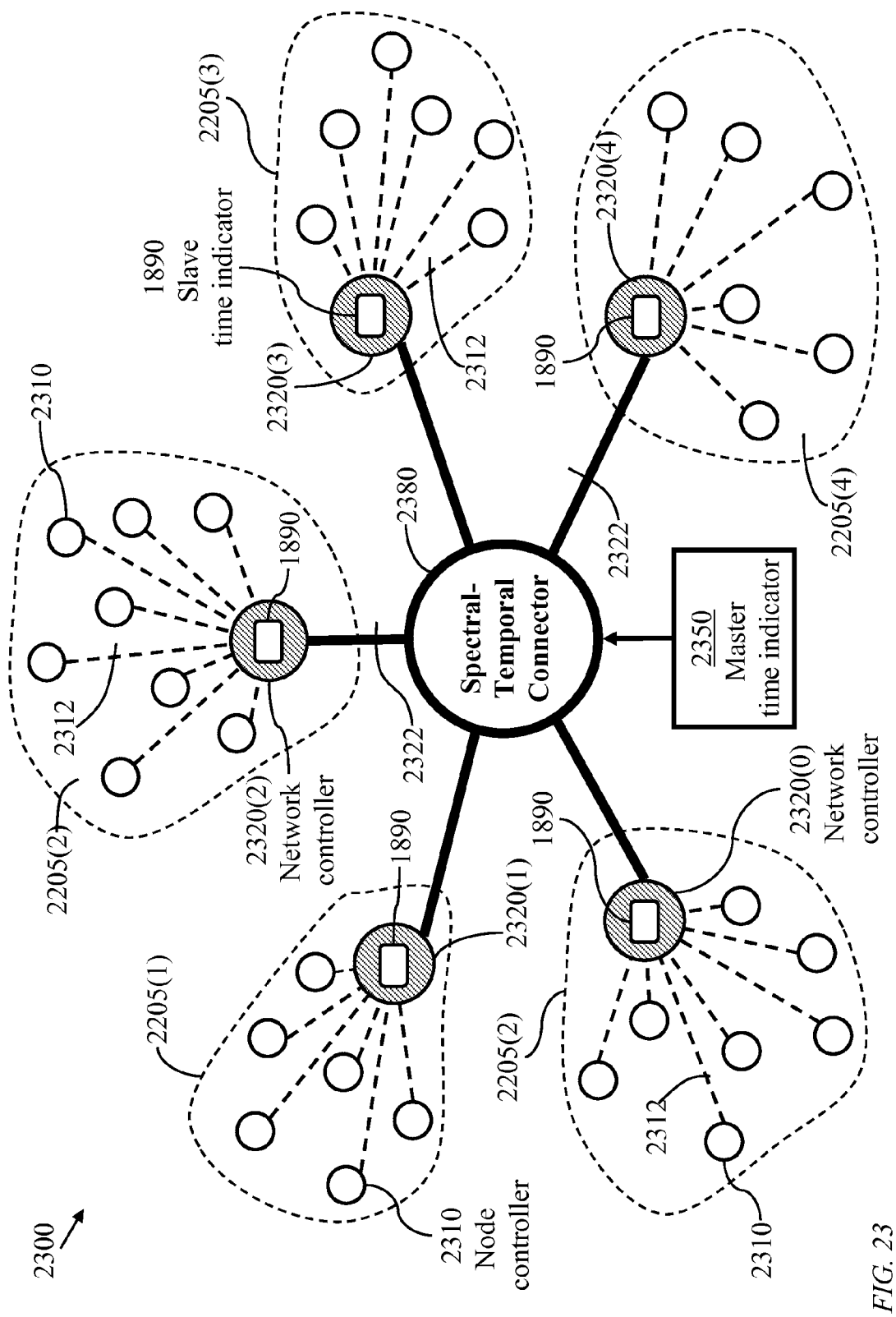
FIG. 23 illustrates connection of node controllers of each network domain to a respective network controller, and interconnection of network controllers of the network of FIG. 22 through a spectral-temporal connector, in accordance with an embodiment of the present invention.

FIG. 23 illustrates interconnection of network controllers 2320 of the network of FIG. 22. Each of the ordinary nodes (local nodes) 2210 of a particular network domain 2205 has a node controller 2310 (similar to node controller 1740). Each node controller 2310 of a particular network domain 2205 preferably has a dedicated path 2312 to the network controller 2320 of the particular network domain 2205. The network controllers 2320 are interconnected in a full mesh structure through a cyclical inter-domain cross connector 2380 preferably implemented as an optical spectral-temporal connector. Each network controller 2320 has a dual WDM link 2322 to the cyclical inter-domain cross connector 2380.

A master time indicator 2350 coupled to the cyclical inter-domain cross connector 2380 may exchange time indications with a slave time indicator 1890 (FIG. 18) coupled to a network controller 2320 for time-aligning the network controller to the master time controller 2350. Cyclical cross connector 2380 may also be configured as a temporal spectral-temporal connector 2100 employing electronic temporal rotators instead of optical temporal rotators as described below with reference to FIG. 30. A spectral-temporal connector as illustrated in FIG. 21 is scalable to interconnect several-thousand network controllers 2380.

A particular network controller 2320 of a particular network domain 2205 may use an inverse routing table to determine identifiers of all routes emanating from the set of nodes of the network domain that traverses a selected link anywhere in the network. The particular network controller then identifies a specific node from which the selected link emanates (or a specific node on which the selected link terminates) and a specific network controller which is communicatively coupled to the specific node. If the specific network controller is a foreign network controller (i.e., it is not the particular network controller itself), the particular network controller communicates the identifiers to the specific network controller for use in a case of state change of the selected link.

Figure 24:
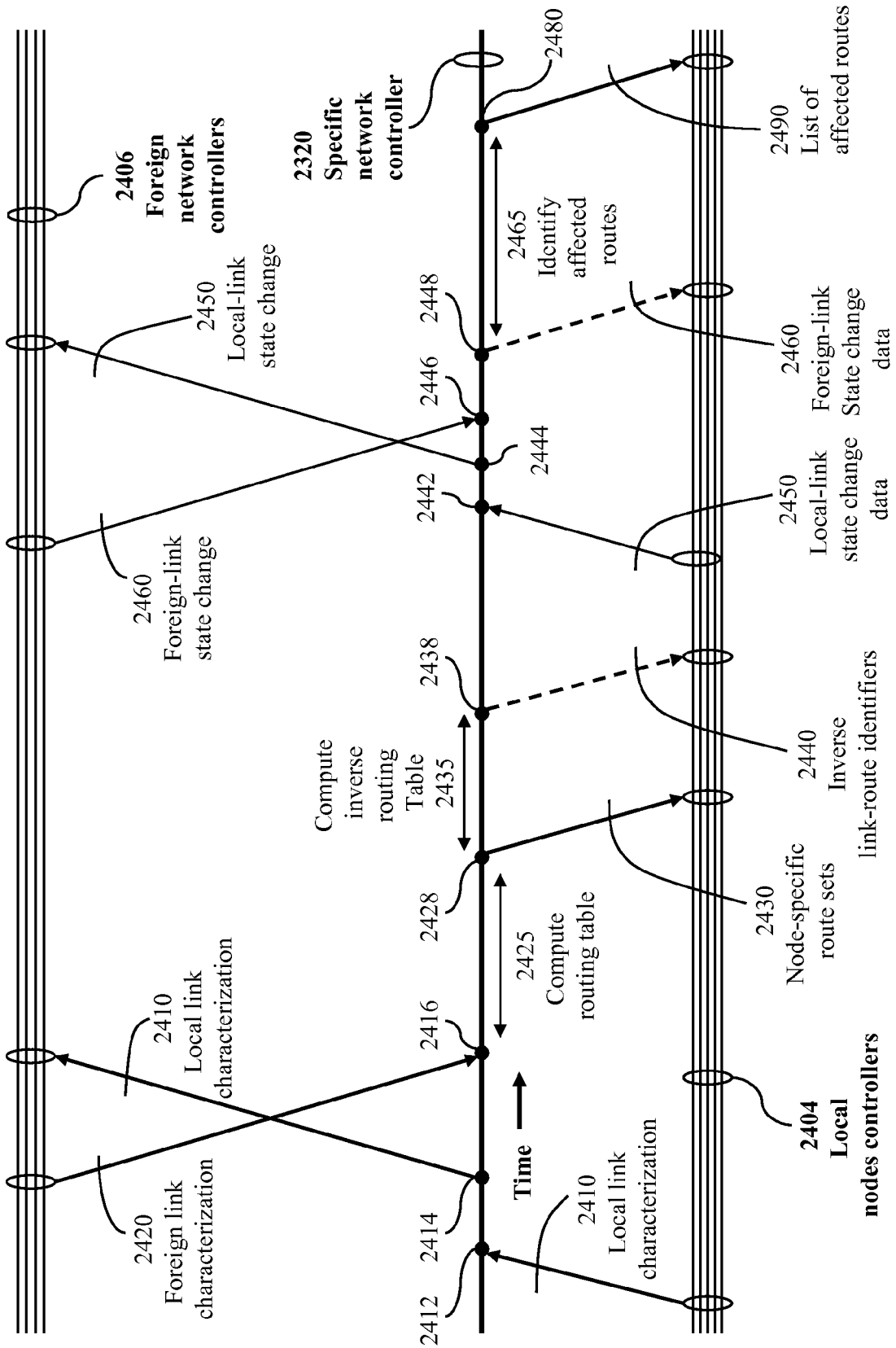
FIG. 24 illustrates control messages exchange in any of the networks of FIG. 12, 14, 16, or 22, in accordance with an embodiment of the present invention.

FIG. 24 illustrates exchange of control messages in the global networks of FIG. 12, 14, 16, or 22. The scheme of exchange of messages applies to a network partitioned according to proximity or a network partitioned according to other considerations. A network controller 2320 of a specific network domain, referenced as a specific network controller 2320, exchanges control messages with node controllers 2404 of nodes of the specific network domain and with foreign network controllers 2406. The specific network controller 2320 may be a network controller of one of the principal nodes 2220 of the network of FIG. 22, or one of the principal nodes 1120-A, 1120-B, 1120-C, and 1120-D of the network of FIG. 12, FIG. 14, or FIG. 16, for example. A principal node 1120 or 2220 may be implemented as a switching node 1800. Thus, the specific network controller 2320 would be a network controller 1850. Likewise, a foreign network controller 2406 would be a network controller 1850. The node controllers 2404, referenced as "local node controllers", would be node controllers of ordinary nodes 1110 or 2210 of the specific network domain. Thus, a local node controller 2404 may be a node controller 1740.

The specific network controller 2320 starts to receive local-link characterization data 2410 from local node controllers 2404 at time instants 2412 (only one time instant 2412 is illustrated) and communicates the local-link characterization data 2410 to foreign network controllers 2406 starting at time instants 2414 (only one time instant 2414 is illustrated). At time instants 2416, the specific network controller 2320 receives foreign-link characterization data 2420 from foreign network controllers 2406 (only one time instant 2416 is illustrated). The specific network controller 2320 computes nodal routing tables 2430 providing route sets during a time interval 2425 and starts to distribute the route sets of nodal routing tables 2430 to respective local node controllers 2404 at a time instant 2428. A nodal routing table 2430 includes route sets of routes originating from nodes of the specific network domain to all nodes of the network. The specific network controller 2320 may compute a nodal routing-table inversion 2440 during a time interval 2435 and start to transmit the nodal routing-table inversion 2440 to local node controllers at a time instant 2438. The specific network controller 2320 may receive local-link state-change data 2450 starting at time instant 2442 and start to communicate the local-link state-change data 2450 to foreign network controllers 2406 at time instant 2444.

Reciprocally, the specific network controller 2320 may receive foreign-link state-change data 2460 starting at time instant 2446 and optionally communicate the foreign-link state-change data 2460 to the local node controllers 2404 starting at a time instant 2448. Such information would be needed at a local node if the local node controller 2404 stores a respective nodal routing-table inversion 2440. The specific network controller 2320 executes an algorithm, during a time interval 2465, for identifying affected routes which traverse a link—local or foreign—experiencing state change and associates each of the affected routes with a respective originating local node 2404. The specific network controller 2320 starts to distribute information 2490 of the affected routes to relevant originating local-node controllers 2404 starting at a time instant 2480.

In an alternate implementation the specific network controller 2320 may distribute network topology information to respective local node controllers 2404 which would then compute respective nodal routing tables.

Figure 25:
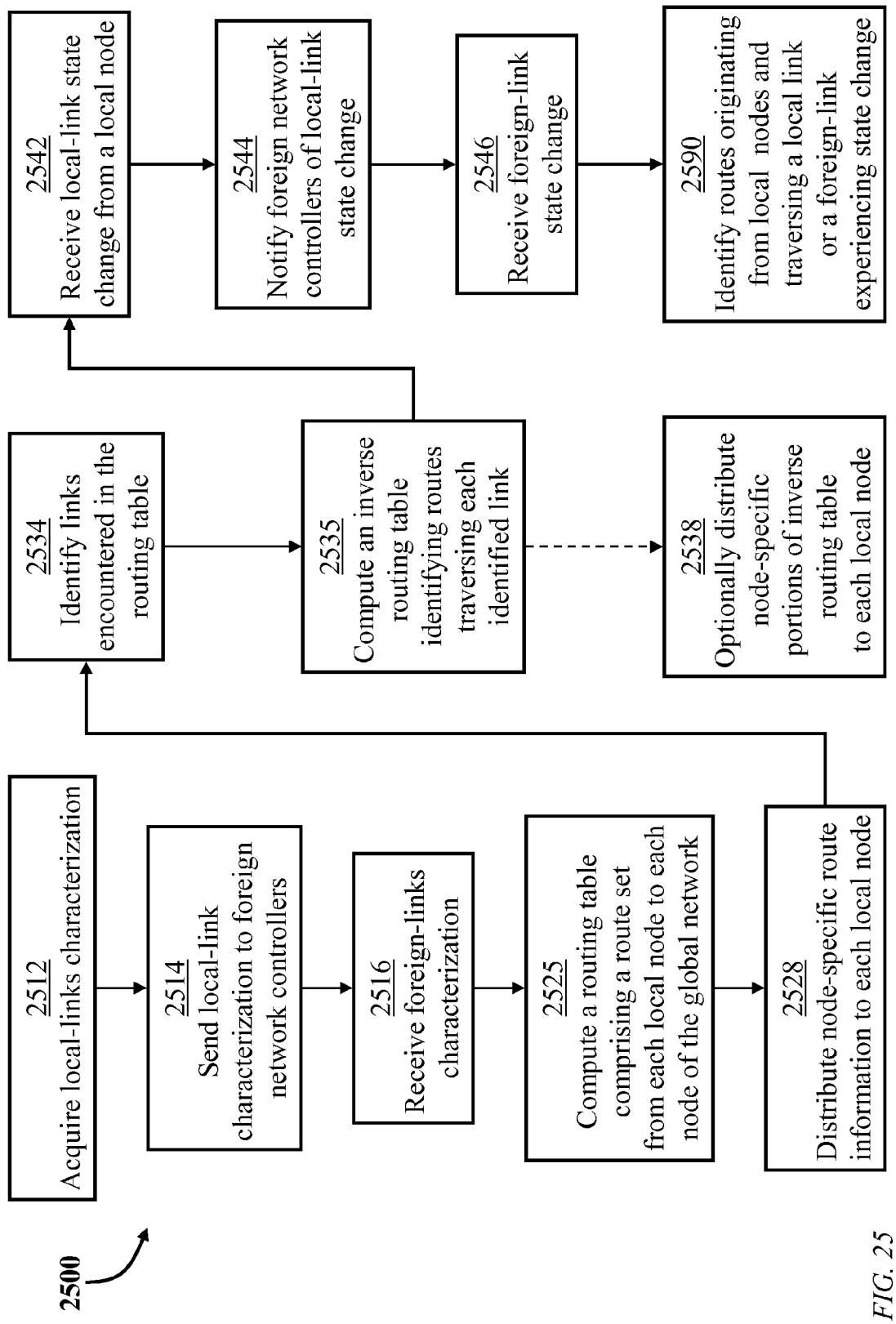
FIG. 25 is a flow chart depicting distributed computation of a routing table and dissemination of link-state information in the global networks of FIG. 12, 14, 16, or 22, in accordance with an embodiment of the present application.

FIG. 25 is a flow chart 2500 depicting a system of distributed computation of a routing table and dissemination of link-state information in the global networks of FIG. 12, 14, 16 or 22 based on the scheme of exchange of control messages of FIG. 24. The specific network controller 2320 executes process 2512 to acquire local link-state characterization within a network domain. A process 2514 sends local link-state characterization to foreign network controllers. A process 2516 receives foreign-link characterization information. Thus, process 2514 and 2516 result in exchange of link-state characterization information among network controllers of the network domains. Based on the local-link characterization and the foreign-link characterization, the specific network controller 2320 computes a partial routing table comprising route sets of routes originating from each node of a network domain to each other node in the global network (process 2525). A process 2528 distributes node-specific nodal routing tables to individual local nodes. A process 2534 identifies links included in the partial routing table. The specific network controller 2320 inverts the partial routing table to indicate, for each directional link included in any of the routes identifiers of routes traversing the directional link (process 2535). A process 2538 optionally distributes an inverted routing-table to local nodes so that a node may avoid a route traversing a failed link or reinstate a route traversing a recovered link. Optionally, portions of the inverted routing table may be distributed to relevant foreign network controllers. A process 2542 receives local-link state-change information 2450 from local nodes. A process 2544 notifies foreign network controllers of local-link state changes 2450. A process 2546 receives foreign-link state-change information 2460. A process 2590 identifies routes originating from local nodes and traversing a link (local or foreign) experiencing state change. A network controller of a network domain 2205 updates a state of each route emanating from a node within the network domain according to received indication of link state change. A route may be identified according to its originating node, or more specifically according to the route's rank within a respective route set.

Processes 2542, 2544, and 2546 together disseminate link-state-change information throughout the network through inter-domain cross-connector 2380 or through other means. Thus, each network controller becomes aware of a condition of a link experiencing state change. As mentioned earlier, the cross connector 2380 may be configured as a spectral-temporal connector 2100 coupled to a master time-indicator 2350. A network controller 2320 may be implemented as a network controller 1850 having a slave time indicator 1890 exchanging time indications with the master time indicator 2350 for time-aligning each network controller 2320 with the master time controller.

The specific network controller 2320 may be further configured to determine identifiers of originating nodes, belonging to the specific network domain, of routes recorded in nodal routing tables 2430 which traverse a link emanating from, or terminating at, a specific node. The specific node may belong to any network domain. The specific network controller 2320 may then communicate the identifiers of originating nodes to a foreign network controller of a network domain to which the specific node belongs. Such exchange of information among the network controllers helps in expediting response to a change in the state of a link. However, in a well structured network, the rate of link-state changes may be relatively small in which case a network controller of a network domain may multicast link-state changes detected within the network domain to each other network controller. Each network controller may then use its own nodal routing-table inversion 2440 to identify and inform relevant local nodes.

Network 2200 of FIG. 22 may be viewed as a number of interconnected sub-networks, or network domains, 2205. Equivalently, Network 2200 may be viewed as a large-scale network partitioned into network domains 2205 which may be administered by a single entity or multiple entities. Each network domain 2205 includes a number of ordinary nodes 2210 and at least one principal node 2220 where each ordinary node 2210 of a network domain 2305 is communicatively coupled to a respective principal node 2220. A switching node 1700 which may serve as an ordinary node 2210 is illustrated in FIG. 17. A switching node 1800 which may serve as a principal node 2220 is illustrated in FIG. 18. Switching node 1800 is coupled to a network controller 1850 which may serve as a network controller 2320 of network 2200. Network 2200 is associated with a control system 2300 having node controllers 2310, network controllers 2320 and an inter-domain cross connector 2380 interconnecting the network controllers. Each node controller 2310 is coupled to a respective node.

As described above, the present invention provides a method of distributed control of network 2200 where each network controller 2320 of a set of network controllers is coupled to a respective principal node 2220. A network controller 2320 has a processor and a memory device and is designated to receive characterizing information of respective links emanating from a respective set of nodes 2205. The network controllers 2320 may be interconnected through inter-domain cross connector 2380 or through other arrangements.

As described above (process 2514), a network controller 2320 of a specific network domain 2205 sends characterizing information 2410 of links within the specific network domain 2205 to each other network controller 2320. The characterizing information may be sent through cross connector 2380. Consequently, each network controller receives (process 2516) characterizing information 2420 of links emanating from nodes coupled to other network controllers 2320. A network controller 2320 of a specific network domain may then determine (process 2525) a route set (a nodal routing table) 2430 from each node of the specific network domain to each other node of network 2200.

A network controller 2320 may send state-change information 2450 pertinent to respective links to each other network controller 2320. The state change information may be sent through inter-domain cross connector 2380 or through other means.

Upon receiving (process 2542 or 2546) an indication of state-change of a specific link, a network controller 2320 identifies (process 2590) a number of route sets which include said specific link. If the number exceeds zero, the network controller updates a state of each route within identified route sets according to the indication of state change.

A network controller of a specific network domain 2205 may execute processor-executable instructions which cause a processor to rearrange routes of a route set originating from a specific ordinary node 2210 into a set of ranked routes as illustrated in FIG. 4 and FIG. 5. The network controller communicates (process 2528) the set of ranked routes to the specific ordinary node.

Each network controller 2320 may be configured to determine (process 2535) an inverse routing table indicating identifiers of specific nodes from which routes traversing each link included in a route set originate. The each network controller further identifies (process 2590) a particular network controller 2320 of the set of network controllers designated to receive characterizing information of each link included in the route set. The each network controller sends to the particular network controller identifiers of the specific nodes. The identifiers of the specific nodes may be sent through the inter-domain cross connector 2380 or through other means.

Upon receiving an indication of state-change of a specific link, a network controller 2320 identifies relevant nodes originating routes traversing the specific link, if any. Where at least one relevant node is found, the network controller communicates the indication of state change to the at least one relevant node.

Network controller 1850 may be used as network controller 2320. A network controller is coupled to a respective principal node 2220 and has a dual link to cross connector 2380. As illustrated in FIG. 18, a network controller 1850 has a dual channel {1853, 1854} from/to switching mechanism 1810 and a dual link {1856, 1858} from/to a cross connector.

A network controller 2320 has a processor and a memory device storing processor-executable instructions which cause the processor to perform processes 2512, 2514, 2525, 2542, 2546, and 2590 described above with reference to FIG. 25. Optionally, the processor-executable instructions may further cause the processor to rearrange a generic route set produced by process 2525 into a set of ranked routes as described above with reference to FIG. 4 and FIG. 5. Process 2528 then communicates the set of ranked routes to respective local nodes associated with the network controller. Optionally, the processor-executable instructions may further cause the processor to execute process 2535 to determine an inverse routing table 2440 identifying all routes traversing a selected link anywhere in the network which originate from the set of nodes associated with the network controller. The processor-executable instructions further cause the processor to execute process 2542 to determine state transition of a link connecting to a node associated with the network controller and communicate the state-transition information to other network controllers which are eligible to receive the state-transition information, through the cross connector 2380 or through other means. The extent of exchange of topology information and state-transition information among network controllers is governed by predefined affinity levels between each network controller and each other network controller.

If the cross connector 2380 is bufferless, the processor-executable instructions further cause the processor to exchange readings of a slave time indicator 1890 coupled to the network controller and a master time indicator 2350 coupled to cross connector 2380 for time-aligning the network controller with the cross connector.

A temporal rotator 2140 distributes signals from m input channels each belonging to one of m WDM input links 2110 to m output channels each belonging to one of m WDM output links 2180.

FIG. 26 and FIG. 27 illustrate distribution of signals through a selected temporal rotator 2140. Each temporal rotator 2140 of the spectral-temporal connector 2100 is configured as temporal rotator 2020 having m input ports 2010, m output ports 2030, a control input port 2012, and a control output port 2032. Each temporal rotator 2140 hosts a timing circuit 2040 coupled to a master time indicator.

FIG. 26 illustrates distribution of signals from the m input channels to the m output channels, for the special case of m=15, of the first temporal rotator 2140(0) of the spectral-temporal connector 2100. In accordance with a preferred embodiment, the timing circuit 2040 connects to control output port 2032 of the temporal rotator 2140(0) to receive timing data 2680 from the network controllers and connects to control input port 2012 of the temporal rotator 2140(0) to distribute corresponding readings of the master time indicator. Thus, the temporal rotator 2140(0) has a number ν of input ports and ν output ports; ν≥(m+1), m>2. The temporal rotator 2140(0) may be an ascending rotator or a descending rotator. In an exemplary network partitioned into 15 network domains, for example, arbitrarily indexed as 0 to 14, a temporal rotator 2140 having 16 input ports and 16 output ports may be employed for exchanging control data, including routing information and timing data, between 15 input ports 2010 and 15 output ports 2030. FIG. 26 illustrates organization of data received at input ports 2010(0) to 2010(14) from 15 network controllers and timing data generated at the timing circuit 2040 carried by channel 2041 to control input port 2012 for distribution to output ports 2030 which are communicatively coupled to respective network controllers.

With an ascending rotator 2140(0), control input port 2012 distributes timing data received from timing circuit 2040 to the 15 output ports {2030(0), 2030(1), . . . , 2030(14)} during time slots 2602 of indices 1 to 15, respectively, of a cyclic time frame organized into 16 time slots indexed as 0 to 15. Control input port 2012 distributes control data (control messages) to the 15 output ports {2030(0), 2030(1), . . . , 2030(14)} during time slots 2602 of indices 1 to 15, respectively of the cyclic time frame.

Input port 2010(0) distributes control data to the 15 output ports {2030(0), 2030(1), . . . , 2030(14} during time slots 2602 of indices 0 to 14, and sends timing data to timing circuit 2040 during a time slot of index 15 of the cyclic time frame.

Input port 2010(8) distributes control data to the 7 output ports {2030(8), 2030(9), . . . , 2030(14)} during time slots 2602 of indices 0 to 6 and sends timing data to timing circuit 2040 during a time slot of index 7 of the cyclic time frame. Input port 2010(8) distributes control data to the 8 output ports {2030(0), 2030(1), . . . , 2030(7)} during time slots 2602 of indices 8 to 15 of the cyclic time frame.

Input port 2010(14) sends control data to output port 2030(14) during time slot 2602 of index 0 and sends timing data to timing circuit 2040 during a time slot 2602 of index 1 of the cyclic time frame. Input port 2010(14) distributes control data to the 14 output ports {2030(0), 2030(1), . . . , 2030(13)} during time slots 2602 of indices 2 to 15 of the cyclic time frame.

Control output port 2032 transfers timing data received at input ports 2010(0) to 2010(15), from network controllers 1850 through links 1858, to timing circuit 2040. An output port 2030(k), 1≤k≤14, transfers control data from timing circuit 2040 to a respective network controller connecting to output port 2030(k). According to the scheme of FIG. 26, each network controller 1850 connects to itself through the rotator 2140(0) during one time slots. The return path may be exploited for certain connectivity verifications.

Array 2610 of FIG. 26 has 16 entries, where each entry corresponds to a time slot 2602 and contains an index of an output port 2030 receiving timing data from timing circuit 2040 during the time slot. Fifteen arrays 2620, individually identified as arrays 2620(0) to 2620(14), identify output ports 2030 of rotator 2140(0) receiving control data. Each array 2620 has 16 entries, where each entry corresponds to a time slot 2602 and contains an index of an output port 2030 receiving control data from a network controller 2320, or from a principal node 2220 hosting the network controller 2320, through an input port 2010. For example, array 2620(9) indicates that the input port 2010(9) sends data from a respective network controller or principal node to output ports 2030 of indices {9, 10, . . . , 14} during time slots of indices {0 to 5} and to output ports 2030 of indices {0, 1, . . . , 8} during time slots of indices 7 to 15. Input ports 2010(7), 2010(8), and 2010(9) send timing data to timing circuit 2040 during time slots of indices 8, 7, and 6, respectively; an input port 2010(j) sends timing data to timing-circuit 2040 during a time slot $(m-j)_{modulo\ \nu}$, where m=15 and ν=16.

FIG. 27, derived from FIG. 26, illustrates an array 2710 having 16 entries, where each entry corresponds to a time slot 2702 and contains an index of an input port 2010 sending timing data to timing circuit 2040 during the time slot. Fifteen arrays 2720, individually indexed as array 2720(0) to 2720(14), identify input ports 2010 of rotator 2140(0) sending control data originating from respective network controllers 2320 (or principal nodes 2220) to a network controller (or a principal node) through an output port 2030 during each time slot of a slotted time frame. Each array 2720 has 16 entries, where each entry corresponds to a time slot 2702 and contains an index of an input port 2010 receiving control data (control messages) from a respective network controller 2320 (or principal node 2220). For example, array 2720(9) indicates that output port 2030(9) receives control data from input ports 2010 of indices {9, 8, . . . , 0}, during the time slots 2702 of indices 0 to 9, and from input ports 2010 of indices {14, 13, . . . , 10}, during the time slots 2702 of indices 11 to 15. Output ports 2030(7), 2030(8), and 2030(9) receive timing data 2780 from timing circuit 2040 during time slots of indices 8, 9, and 10, respectively; an output port 2010(k) receives timing data 2780 from timing-circuit 2040 during a time slot (k+1), 0≤k≤ν.

FIG. 26 and FIG. 27 illustrate distribution of signals from m WDM input links of indices {0–(m−1)} to m WDM output links of indices {0–(m−1)} through a first temporal rotator 2140(0) of spectral-temporal connector 2100 of FIG. 21, where m=16. Likewise, with each temporal rotator 2140 configured as a temporal rotator 2020 coupled to a timing circuit:

temporal rotator 2140(1) distributes signals from WDM input links 2110 of indices 15-29 to WDM output links of indices 0-14;

temporal rotator 2140(2) distributes signals from WDM input links of indices 30-44 to WDM output links of indices 0-14;

temporal rotator 2140(3) distributes signals from WDM input links of indices 0-14 to WDM output links of indices 15-29;

temporal rotator 2140(4) distributes signals from WDM input links of indices 15-29 to WDM output links of indices 15-29;

temporal rotator 2140(5) distributes signals from WDM input links of indices 30-44 to WDM output links of indices 15-29;

temporal rotator 2140 (6) distributes signals from WDM input links of indices 0-14 to WDM output links of indices 30-44;

temporal rotator 2140(7) distributes signals from WDM input links of indices 15-29 to WDM output links of indices 30-44; and temporal rotator 2140(8) distributes signals from WDM input links of indices 30-44 to WDM output links of indices 30-44.

Selective Data Dissemination

A network administrator of a network domain may define a level of affinity between the network domain and each other network domain in a global network encompassing numerous network domains. The level of affinity between a first network domain and a second network domain filters characterizing information of nodes and links of the first domain that may be communicated to the second network domain.

Each network domain has at least one network controller. Exchange of network-domain topology data between two network controllers may be controlled according to the level of affinity between the two network domains.

Figure 28:
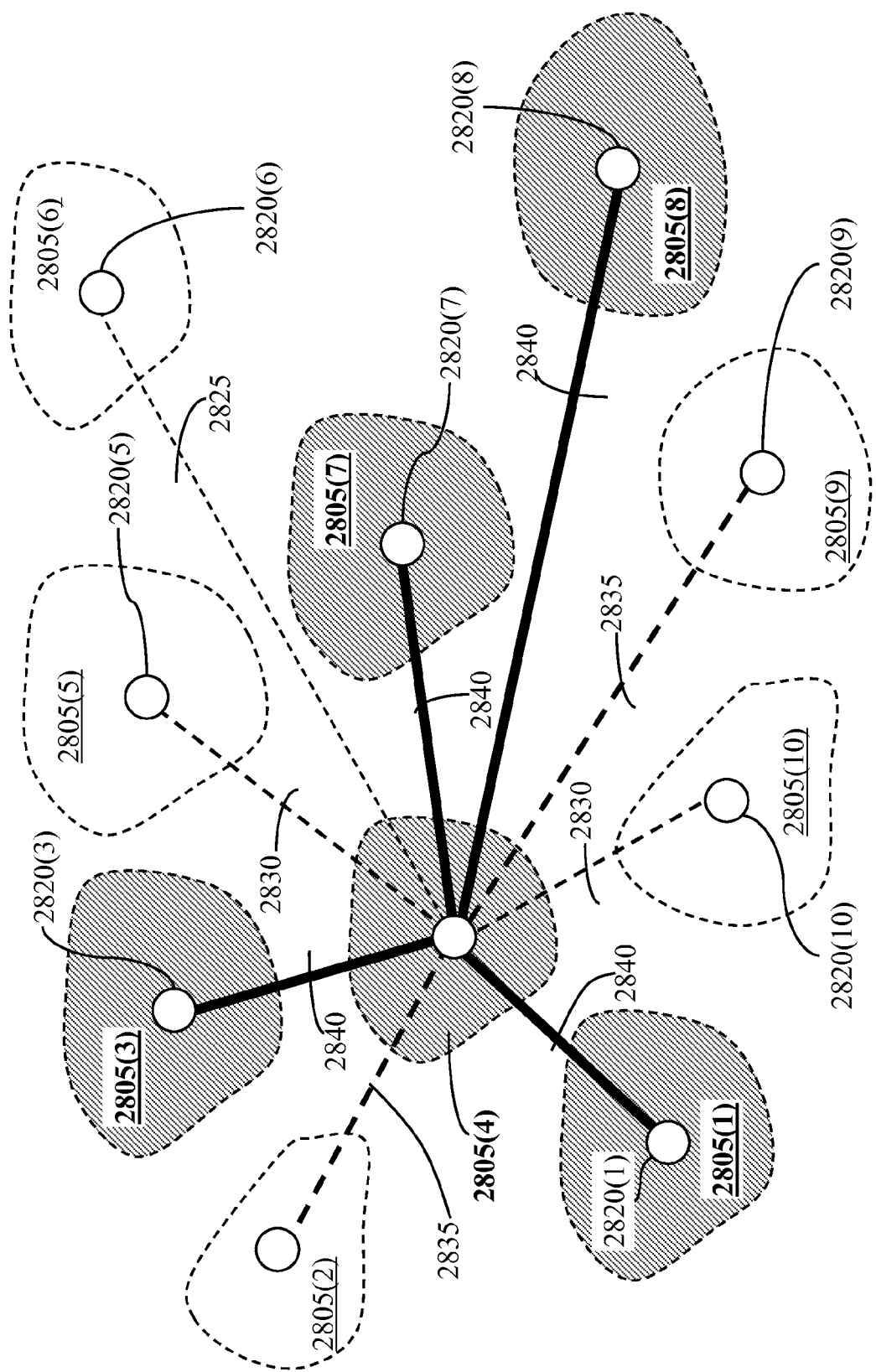
FIG. 28 illustrates selective topology-data dissemination in accordance with an embodiment of the present invention.

FIG. 28 illustrates selective topology-data dissemination from a network controller to other network controllers according to inter-domain affinity. Ten network domains (nodal domains) 2805, individually identified as 2805(1) to 2805(10), are illustrated each having a respective network controller 2820. The network controllers are individually identified as 2820(1) to 2820(10). Network domains 2805(1), 2805(3), 2805(4), 2805(7), and 2805(8) have a high level of mutual affinity. Thus, network controller 2820(4) of network domain 2805(4) may transmit full topology data 2840 of network domain 2805(4) to network controllers 2820(1), 2820(3), 2820(7), and 2820(8). Network domain 2805(4) has a lower level of affinity with network domains 2805(2) and 2805(9), thus network controller 2820(4) sends a smaller portion 2835 of the topology data of network domain 2805(4) to controllers 2820(2) and 2820(9). Likewise, network controller 2805(4) may send even lesser topology data 2830 to controllers of network domains 2805(5) and 2805(10), and much lesser topology data 2825 to the network controller of network domain 2805(6).

The number of network domains 2805 illustrated in FIG. 28 is relatively small. However, it is understood that the number of network domains may be much larger—several thousands for example. It is also understood that although network domains 2805(1) to 2805(10) are illustrated as appearing to be spatially disjoint, some network domains may cover overlapping geographic areas as illustrated in FIG. 13.

Referring to FIG. 24, the extent of the local characterizing data 2410 sent from the specific network controller 2320 to a particular foreign network controller 2406 depends on the affinity level between the network domain having the specific network controller 2320 and the network domain having the particular foreign network controller 2406.

Thus, as described above, a large-scale network may be partitioned into several network domains each having a respective set of nodes and a respective network controller. Methods and apparatus for coordinated intra-domain control and inter-domain routing control are disclosed above. A state-change of any link can be expeditiously communicated to relevant network controllers to take corrective actions where necessary.

FIG. 29 illustrates a control network 2900 comprising a spectral-temporal connector 2100 interconnecting nodes 2910 and 2920 of different capacities and, optionally, a central controller 2980 to form a full-mesh control network 2900. The central controller 2980 has at least one dual link to the spectral-temporal connector 2100. A basic node 2910, connecting to a dual access link 2912 from a principal node 2220 or network controller 2320, has one dual WDM link 2948 to the spectral-temporal connector 2100. A node 2920 of a higher capacity, connecting to a number of access links 2912 and two or more dual WDM links 2948 to the spectral-temporal connector 2100, may be viewed as two or more basic nodes 2910. With each dual WDM link 2948 having Λ channels (i.e., carrying Λ spectral bands) in each direction, Λ>1, and each temporal rotator 2140 of spectral-temporal connector 2100 having m dual ports 2010/2030 to external nodes, control network 2900 may support Λ×m basic nodes 2910. With Λ=64 and m=127, for example, control network 2900 may support 8128 basic nodes 2910 if no higher-capacity nodes are present and a central controller 2980 is not provided. Control network 2900 may support any combination of basic nodes, higher-capacity nodes, and/or a central controller 2980 provided the total number of dual links 2948 does not exceed Λ×m.

Control network 2900 may interconnect a large number of network controllers 2320 (or principal nodes 2220) where a node 2910 or 2920 represents a network controller 2320 (or a principal node 2220). Exchange of topology information and state-transition information among network controllers through control network 2900 is governed by predefined affinity levels between each network controller and each other network controller.

Figure 30:
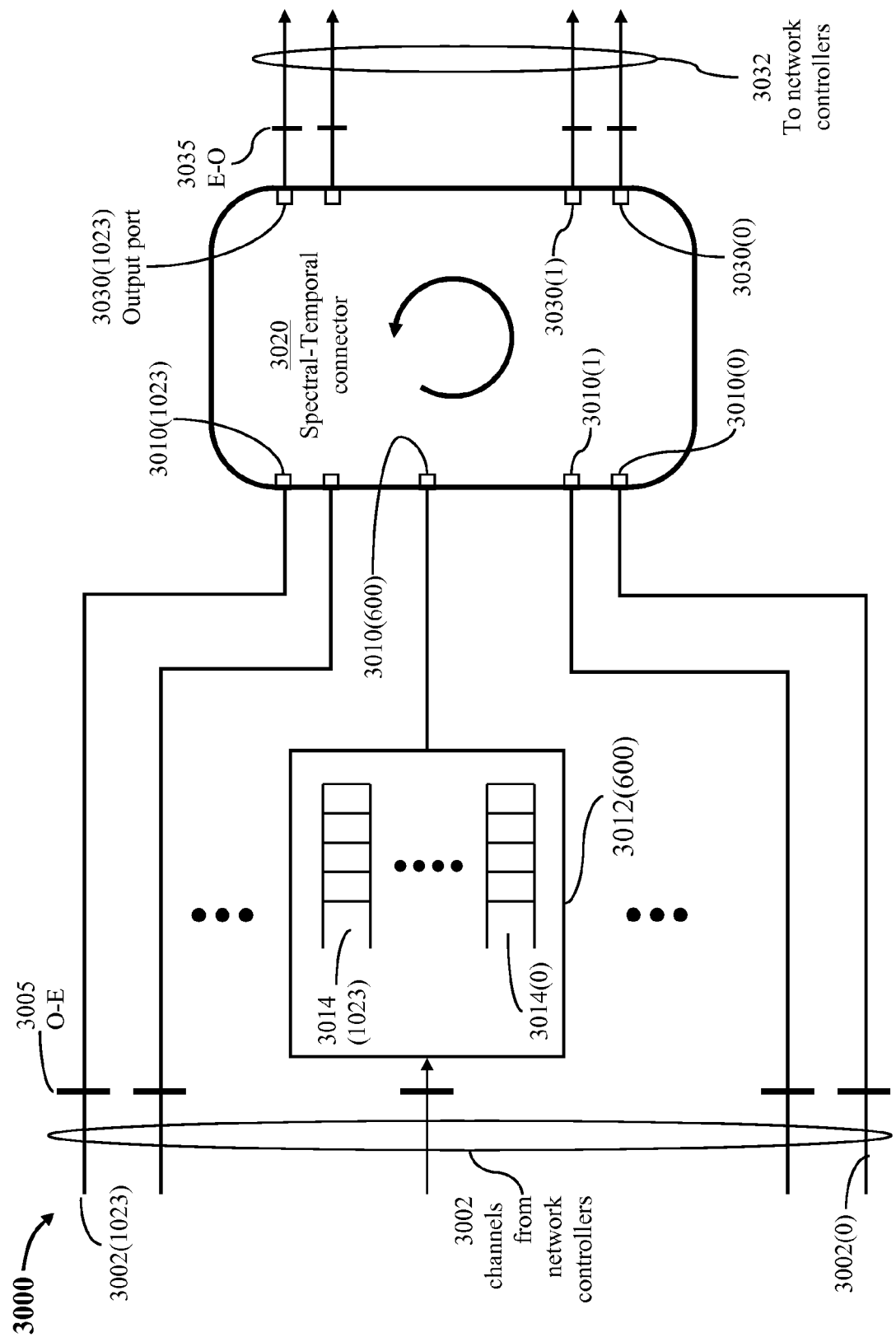
FIG. 30 illustrates a cross connector comprising an electronic spectral-temporal connector for interconnecting network controllers or principal nodes, in accordance with an embodiment of the present invention.

FIG. 30 illustrates a cross connector 3000 comprising an electronic rotator 3020 having a number m of input ports 3010, individually identified as input ports 3010(0) to 3010(m−1), and m output ports 3030 individually identified as output ports 3030(0) to 3030(m−1). Cross connector 3000 may interconnect m network controllers 2320, each coupled to a principal node 2220; m=1023 in the exemplary cross connector 3000. With optical channels 3002 and 3032 connecting the network controllers 2320 (or principal nodes 2220) to the electronic cross connector 3000, optical-electrical converters 3005 are provided at input ports 3010 and electrical-optical converters 3035 are provided at output ports 3030. Each input port 3010 connects to an incoming channel 3002 through a respective optical-to-electrical converter 3005 and each output port 3030 connects to an outgoing channel 3032 through a respective electrical-to-optical converter 3035. Each incoming channel 3002 originates from a respective network controller 2320 (or a principal node 2220) and each outgoing channel 3032 is directed to a respective network controller 2320 (or a principal node 2220).

Network controllers 2320 of principal nodes 2220 transmit to cross connector 3000 control data organized into data segments each data segment directed to a respective destination network controller 2320. The boundaries of data segments sent from different network controllers are generally not time aligned when received at input ports 3010.

Each input port 3010 may have an input buffer 3012 logically organized into buffer sections 3014, individually referenced as 3014(0) to 3014(m−1), where each buffer section holds a data segment directed to a respective output port 3030. Only one buffer 3012 of input port 3010(600) is illustrated. Data segments received at an input port 3010 and directed to different output ports 3030 towards respective destination network controllers arrive sequentially and may be held in respective buffer sections 3014. Since input buffers are provided, cross connector 3000 need not exchange timing data with connecting network controllers

2320. Alignment of data segments at the input ports 3010 may rely on a local time indicator (not illustrated) at the cross connector 3000.

Despite the feasibility of employing buffers at input ports 3010 of the electronic rotator 3020, it may be preferable to avoid buffering at the cross connector and rely on time alignment of the m network controllers 2320 communicatively coupled to the electronic rotator 3020 using a timing circuit and a master time indicator in an arrangement similar to that of the timing circuit 2040 and master time indicator 2050 coupled to the optical temporal rotator of FIG. 20.

An input port 3010 connects to an output port 3030 during one time slot of a rotation cycle. The rotation cycle may cover more than m time slots if input ports 3010 need to access other circuitry coupled to the rotator 3020. For example, if a timing circuit similar to that of the optical rotator of FIG. 20 is coupled to at least one control output port and at least one control input port of rotator 3020, the rotation cycle would cover a number ν of time slots exceeding m; ν≥(m+1). A network controller transmits one data block of a predetermined size to a specific destination network controller during each time frame. The maximum delay at a buffer section 3014 is one rotation cycle. Thus, at any instant of time, a buffer section may hold only one data block.

The above organization of the input buffers 3012 is provided for selective distribution of control data of a channel 3002 from a network controller to other network controllers connecting to output ports 3030. In another control scheme, each network controller 2320 may broadcast control data to all other network controllers. Consequently, a buffer 3012 would hold a data block during an entire rotation cycle and transfers the data block to each output port 3030. The data block is then overwritten in a subsequent rotation cycle.

As described above, a spectral-temporal connector 2100 connects WDM input links 2110, each carrying signals occupying Λ spectral bands, to WDM output links 2180, each carrying signals occupying Λ spectral bands, Λ>1. The spectral-temporal connector 2100 employs an array of temporal rotators 2140, each temporal rotator 2140 having m input ports each connecting to a channel of a WDM input link 2110 and m output ports each connecting to a channel of a WDM output link 2180, m>2. The maximum number of WDM input links 2110 or WDM output links 2180 is Λ×m. A temporal rotator may also have a control input port and a control output port as illustrated in FIG. 20.

A temporal rotator 2140 may be implemented as a fast optical rotator 2020 (FIG. 20) or an electronic rotator 3020 (FIG. 30). An electronic rotator scales easily to support thousands of dual input/output ports while a fast optical rotator scales to a much smaller dimension. A spectral-temporal connector 2100 employing electronic rotators each having 1024 input ports 3010 and 1024 output ports 3030, with WDM input links 2110 and WDM output links 2180 each carrying 16 spectral bands (Λ=16), for example, may interconnect more than 16000 network controllers 2320.

Thus, an inter-domain cross connector interconnecting principal nodes 2220 may be configured as a spectral router, a temporal rotator, or a spectral-temporal connector. A spectral-router provides an entire spectral band (a channel) from each principal node 2220 (or a respective network controller 2320) to each other principal node 2220 (or to each other network controller 2320). Thus, a spectral router would be suitable for a network 2200 organized into a relatively small number of network domains 2205.

A temporal rotator provides a path of a fraction of the capacity of a channel from each principal node 2220 (or a respective network controller 2320) to each other principal node 2220 (or to each other network controller 2320). Thus, a temporal router would be suitable for a network 2200 organized into a medium number of network domains 2205.

A spectral-temporal connector 2380 of the configuration 2100 of FIG. 21 scales to support a relatively large number of WDM input links 2110 and WDM output links 2180 (FIG. 21) interconnecting principal nodes 2220 (or respective network controllers 2320). A spectral-temporal connector provides a path of a fraction of the capacity of a channel from each principal node 2220 (or a respective network controller 2320) to each other principal node 2220 (or to each other network controller 2320). Thus, a spectral router would be suitable for a network 2200 organized into a relatively large number—exceeding 4000 for example—of network domains 2205.

A spectral router connecting WDM links each carrying Λ spectral bands, Λ>1, interconnects (Λ+1) network controllers. A temporal rotator having m input ports and m output ports, m>1, interconnects m network controllers if each network controller has a return path to itself through the rotator; otherwise, the temporal rotator may interconnect (m+1) network controllers. A spectral-temporal connector 2380/2100 having $\Lambda^2$ rotators, each rotator having m input ports and m output ports (in addition to control ports where applicable), interconnects m×Λ network controllers 2320.

For example, with WDM links each carrying 32 spectral bands (Λ=32), a spectral router may interconnect up to 33 network controllers. With m=127, for example, a temporal rotator may interconnect 127 network controllers 2320 if each network controller has a return path to itself through the rotator. Otherwise, the temporal rotator may interconnect 128 network controllers. A spectral-temporal connector employing 1024 temporal rotators each having 127 input ports and 127 output ports may interconnect 4064 principal nodes 2220, or 4064 network controllers 2320, where each network controller 2320 connects to the spectral-temporal connector through a dual WDM link each carrying 32 spectral bands in each direction (Λ=32 and m=127). A spectral-temporal connector employing 256 electronic rotators, each having 1023 dual ports, may interconnect 16368 network controllers, each network controller 2320 connecting to the spectral-temporal connector through a dual WDM link each carrying 16 spectral bands in each direction (Λ=16 and m=1023).

It is noted that while the inter-domain cross connector, however configured, provides control paths for transferring control data, high-priority payload data may also be exchanged among principal nodes 2220 through the inter-domain cross connector.

It should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of distributed control of a network having a plurality of nodes interconnected by a plurality of links, the method comprising:
   coupling each network controller of a set of network controllers to a respective node, said each network controller comprising a respective hardware processor;
   interconnecting said network controllers through a cross connector; and performing at said each network controller processes of:
receiving local characterizing information and local state-change information of local links emanating from a respective set of nodes;
sending said local characterizing information and local state-change information to each other network controller through said cross connector;
receiving characterizing information of links emanating from nodes coupled to other network controllers;
determining a route set from each node of said respective set of nodes to each other node of said plurality of nodes;
receiving an indication of state-change of a specific link of said plurality of links;
identifying a number of route sets which include said specific link; and
where said number exceeds zero, updating a state of each route within said number of route sets according to said indication of state change.

2. The method of claim 1 wherein said coupling comprises connecting said each network controller to a dual port of a switching mechanism of said respective node.

3. The method of claim 1 further comprising exchanging control data between a central controller coupled to said cross connector and said each network controller.

4. The method of claim 1 further comprising exchanging time indications between a master time indicator coupled to said cross connector and a slave time indicator coupled to said each network controller for time-aligning said each network controller to said master time indicator.

5. The method of claim 1 further comprising:
said respective hardware processor executing software instructions to rearrange routes of said route set into a set of ranked routes; and
communicating said set of ranked routes to said each node of said respective set of nodes.

6. The method of claim 1 further comprising configuring said each network controller to perform processes of:
determining an inverse routing table indicating, for each link included in said route set, identifiers of specific nodes, of said respective set of nodes, originating routes traversing said each link;
identifying a particular network controller of said set of network controllers designated to receive characterizing information of said each link; and
sending from said each network controller to said particular network controller, through said cross connector, identifiers of said specific nodes.

7. The method of claim 1 further comprising configuring said cross connector as a cyclical cross connector implemented as a spectral-temporal connector configured to transfer a time-limited signal from said each network controller to each other network controller.

8. A method of distributed control of a network having a plurality of nodes interconnected by a plurality of links, the method comprising:
coupling each network controller of a set of network controllers to a respective node, said each network controller comprising a respective hardware processor;
interconnecting said network controllers through a cross connector; and
performing at said each network controller processes of:
receiving local characterizing information and local state-change information of local links emanating from a respective set of nodes;
sending said local characterizing information and local state-change information to each other network controller through said cross connector;
receiving characterizing information of links emanating from nodes coupled to other network controllers;
determining a route set from each node of said respective set of nodes to each other node of said plurality of nodes;
receiving an indication of state change of a specific link of said plurality of links;
identifying a number of nodes, of said respective set of nodes, originating routes traversing said specific link; and
where said number exceeds zero, communicating said indication of state change to said number of nodes.

9. A system of distributed control of a network having a plurality of nodes interconnected by links, the system comprising:
a plurality of network controllers, each network controller coupled to a respective node and comprising a hardware processor; and
a cross connector interconnecting said network controllers;
said hardware processor executing software instructions to:
acquire characterizing information and state-change information of links emanating from a respective set of nodes communicatively coupled to said each network controller;
send said characterizing information and state-change information to each other network controller through said cross connector;
receive characterizing information of links emanating from nodes coupled to other network controllers;
determine a route set from each node of said respective set of nodes to each other node of said plurality of nodes;
receive an indication of state-change of a specific link of said plurality of links;
identify a number of route sets which include said specific link; and
where said number is greater than zero, update a state of each route within said number of route sets according to said indication of state change.

10. The system of claim 9 wherein said each network controller is configured to determine, for each directional link included in said route set, identifiers of specific route sets which traverse said each directional link.

11. The system of claim 9 wherein:
said cross connector is configured as a spectral-temporal connector coupled to a master time indicator; and
said each network controller has a slave time indicator exchanging time indications with said master time indicator for time-aligning said each network controller to said master time indicator.

12. The system of claim 9 wherein said cross connector comprises:
input ports each having a memory device storing control data from a respective network controller directed to each other network controller; and
an electronic spectral-temporal connector for cyclically distributing said control data to output ports connecting to respective network controllers.

13. A network comprising a plurality of nodes interconnected by a plurality of links, and a plurality of network controllers, each network controller comprising:

a dual link to a spectral-temporal connector configured to transfer time-limited signals from said each network controller to each other network controller; and a hardware processor executing software instructions to:
acquire characterizing information of each link emanating from each node of a respective set of nodes communicatively coupled to said each network controller;
send to other network controllers through said spectral-temporal connector:
said characterizing information; and
state-change notifications pertinent to links connecting to said respective set of nodes:
receive characterizing information of links emanating from nodes coupled to other network controllers;
determine a route set from said each node to each other node of said plurality of nodes;
receive a specific notification of state-change of a particular link of said plurality of links;
identify at least one route traversing said particular link; and update a state of each route of said at least one route according to said specific notification.

14. The network of claim 13 wherein said software instructions further cause said hardware processor to: rearrange said route set into a set of ranked routes; and communicate said set of ranked routes to said each node.

15. The network of claim 13 wherein said software instructions further cause said hardware processor to determine an inverse routing table identifying all routes traversing a selected link of said plurality of links and originating from said respective set of nodes.

16. The network of claim 13 wherein said software instructions further cause said hardware processor to:
determine state transition of a link connecting to a node of said respective set of nodes; and
communicate said state transition to each of said other network controllers through said spectral-temporal connector.

17. The network of claim 13 wherein said software instructions further cause said hardware processor to exchange readings of a slave time indicator coupled to said each network controller and a master time indicator coupled to said spectral- temporal connector for time-aligning said network controller to said spectral-temporal connector.

18. The network of claim 13 further comprising a central controller having at least one dual link to said spectral-temporal connector.

* * * * *